United States Patent [19]
Tsuchiya et al.

[11] Patent Number: 5,917,791
[45] Date of Patent: Jun. 29, 1999

[54] APPARATUS FOR DISCRIMINATING OPTICAL RECORDING MEDIA OF DIFFERENT THICKNESSES FROM EACH OTHER AND REPRODUCING INFORMATION THEREFROM

[75] Inventors: Yoichi Tsuchiya; Seiji Kajiyama; Yasuyuki Kanou; Shuichi Ichiura; Koichi Tada, all of Gifu; Masami Shimizu; Toshio Harada, both of Gunma, all of Japan

[73] Assignee: Sanyo Electric Co., Ltd., Osaka, Japan

[21] Appl. No.: 08/689,019

[22] Filed: Jul. 30, 1996

[30] Foreign Application Priority Data

| Nov. 30, 1995 | [JP] | Japan | 7-311742 |
| Jan. 22, 1996 | [JP] | Japan | 8-008319 |
| Jan. 30, 1996 | [JP] | Japan | 8-014559 |
| Jan. 30, 1996 | [JP] | Japan | 8-014560 |
| Apr. 26, 1996 | [JP] | Japan | 8-107853 |
| May 23, 1996 | [JP] | Japan | 8-128454 |

[51] Int. Cl.$^6$ ............................... G11B 3/90; G11B 7/00
[52] U.S. Cl. ............................................. 369/58; 369/112
[58] Field of Search ................................. 369/54, 58, 112, 369/44.25, 43, 44.11, 44.14, 44.26, 44.27, 44.29, 47, 50, 53

[56] References Cited

U.S. PATENT DOCUMENTS

| 5,003,521 | 3/1991 | Yoshida et al. | 369/44.25 |
| 5,235,581 | 8/1993 | Miyagawa et al. | 369/58 X |

FOREIGN PATENT DOCUMENTS

| 5-303766 | 11/1993 | Japan . |
| 6-259804 | 9/1994 | Japan . |

*Primary Examiner*—Paul W. Huber
*Attorney, Agent, or Firm*—Armstrong, Westerman, Hattori, Mcleland & Naughton

[57] ABSTRACT

An apparatus for discriminating optical disks has an optical pickup provided with an objective lens having an effective numerical aperture of 0.55 to 0.65, which can compatibly reproduce information from a CD and an SD. The apparatus discriminates presence/absence of waveforms of two focus error signals detected when the effective numerical aperture of the objective lens is set at 0.55 to 0.65 and 0.20 to 0.45 respectively in a process of performing focus servo control, thereby discriminating various types of optical disks from each other. Thus, optical disks having different substrate thicknesses, different track pitches, different minimum pit lengths and different reflectivity can be quickly and simply discriminated from each other.

13 Claims, 38 Drawing Sheets

A: FOCUS ERROR SIGNAL

FIG.1

| TYPE | | FIRST OPTICAL DISK (CD) | SECOND OPTICAL DISK (SD) | | THIRD OPTICAL DISK (HSD) | |
|---|---|---|---|---|---|---|
| | | | SINGLE-SIDED RECORDING (SD1) | DOUBLE-SIDED RECORDING /SINGLE-SIDED READING (SD2) | SINGLE-SIDED RECORDING (HSD1) | DOUBLE-SIDED RECORDING /SINGLE-SIDED READING (HSD2) |
| RATED VALUES | READING SURFACE SIDE SUBSTRATE THICKNESS | 1.2mm (1.1~1.3mm) | 0.6mm (0.55~0.65mm) | | 0.6mm (0.55~0.65mm) | |
| | MINIMUM PIT LENGTH | 0.83 μm (0.80~0.90μm) | 0.40 μm (0.38~0.42μm) | | 0.25 μm (0.20~0.30μm) | |
| | TRACK PITCH | 1.6 μm (1.5~1.7μm) | 0.74 μm (0.69~0.79μm) | | 0.50 μm (0.42~0.58μm) | |
| | REFLECTION FACTOR | AT LEAST 70% | AT LEAST 70% | 20~40% | AT LEAST 70% | 20~40% |
| REPRO- DUCING CONDI- TIONS | SPOT DIAMETER | 1.50 μm (1.30~1.70μm) | 0.90 μm (0.70~1.10μm) | | 0.60 μm (0.40~0.80μm) | |
| | NUMERICAL APERTURE | 0.25 (0.20~0.30) | 0.42 (0.30~0.55) | | 0.60 (0.55~0.65) | |
| | WAVELENGTH | 430nm (350~450nm) | | | | |

FIG.2

| | TYPE | FIRST OPTICAL DISK (CD) | SECOND OPTICAL DISK (SD) | | THIRD OPTICAL DISK (HSD) | |
| --- | --- | --- | --- | --- | --- | --- |
| | | | SINGLE-SIDED RECORDING (SD1) | DOUBLE-SIDED RECORDING/SINGLE-SIDED READING (SD2) | SINGLE-SIDED RECORDING (HSD1) | DOUBLE-SIDED RECORDING/SINGLE-SIDED READING (HSD2) |
| RATED VALUES | READING SURFACE SIDE SUBSTRATE THICKNESS | 1.2mm (1.1~1.3mm) | 0.6mm (0.55~0.65mm) | | 0.6mm (0.55~0.65mm) | |
| | MINIMUM PIT LENGTH | 0.83 μm (0.80~0.90 μm) | 0.40 μm (0.38~0.42 μm) | | 0.25 μm (0.20~0.30 μm) | |
| | TRACK PITCH | 1.6 μm (1.5~1.7 μm) | 0.74 μm (0.69~0.79 μm) | | 0.50 μm (0.42~0.58 μm) | |
| | REFRECTION FACTOR | AT LEAST 70% | AT LEAST 70% | 20~40% | AT LEAST 70% | 20~40% |
| REPRODUCING CONDITIONS | SPOT DIAMETER | 1.55 μm (1.35~1.75 μm) | 0.95 μm (0.75~1.15 μm) | | 0.80 μm (0.60~1.0 μm) | |
| | NUMERICAL APERTURE | 0.32 (0.25~0.40) | 0.48 (0.40~0.55) | | 0.60 (0.55~0.65) | |
| | WAVELENGTH | 532nm (450~550nm) | | | | |

FIG.3

| TYPE | | FIRST OPTICAL DISK (CD) | SECOND OPTICAL DISK (SD) | | THIRD OPTICAL DISK (HSD) | |
|---|---|---|---|---|---|---|
| | | | SINGLE-SIDED RECORDING (SD1) | DOUBLE-SIDED RECORDING/SINGLE-SIDED READING (SD2) | SINGLE-SIDED RECORDING (HSD1) | DOUBLE-SIDED RECORDING/SINGLE-SIDED READING (HSD2) |
| RATED VALUES | READING SURFACE SIDE SUBSTRATE THICKNESS | 1.2mm (1.1~1.3mm) | 0.6mm (0.55~0.65mm) | | 0.6mm (0.55~0.65mm) | |
| | MINIMUM PIT LENGTH | 0.83 μm (0.80~0.90 μm) | 0.40 μm (0.3~0.5 μm) | | 0.25 μm (0.20~0.30 μm) | |
| | TRACK PITCH | 1.6 μm (1.5~1.7 μm) | 0.74 μm (0.73~0.75 μm) | | 0.55 μm (0.5~0.6 μm) | |
| | REFLECTION FACTOR | AT LEAST 70% | AT LEAST 70% | 20~40% | AT LEAST 70% | 20~40% |
| | SPOT DIAMETER | 1.5 μm (1.4~1.6 μm) | 0.9 μm (0.85~1.95 μm) | | 0.65 μm (0.6~0.7 μm) | |
| REPRODUCING CONDITIONS | NUMERICAL APERTURE | 0.42 (0.3~0.55) | 0.60 (0.55~0.65) | | 0.60 (0.55~0.65) | |
| | WAVELENGTH | 635nm (585~685nm) | | | | |

FIG. 4

| | TYPE | FIRST OPTICAL DISK (CD) | SECOND OPTICAL DISK (SD) | | THIRD OPTICAL DISK (HSD) | |
|---|---|---|---|---|---|---|
| | | | SINGLE-SIDED RECORDING (SD1) | DOUBLE-SIDED RECORDING/SINGLE-SIDED READING (SD2) | SINGLE-SIDED RECORDING (HSD1) | DOUBLE-SIDED RECORDING/SINGLE-SIDED READING (HSD2) |
| RATED VALUES | READING SURFACE SIDE SUBSTRATE THICKNESS | 1.2mm (1.1~1.3mm) | 0.6mm (0.55~0.65mm) | | 0.6mm (0.55~0.65mm) | |
| | MINIMUM PIT LENGTH | 0.83 μm (0.80~0.90 μm) | 0.40 μm (0.3~0.5 μm) | | 0.25 μm (0.20~0.30 μm) | |
| | TRACK PITCH | 1.6 μm (1.5~1.7 μm) | 0.74 μm (0.73~0.75 μm) | | 0.55 μm (0.5~0.6 μm) | |
| | REFLECTION FACTOR | AT LEAST 70% | AT LEAST 70% | 20~40% | AT LEAST 70% | 20~40% |
| REPRODUCING CONDITIONS | SPOT DIAMETER | 1.5 μm (1.4~1.6 μm) | 0.9 μm (0.85~0.95 μm) | | 0.65 μm (0.6~0.7 μm) | |
| | NUMERICAL APERTURE | 0.42 (0.30~0.55) | 0.60 (0.55~0.65) | | 0.60 (0.55~0.65) | |
| | WAVELENGTH | 650nm (600~700nm) | | | | |

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

FIG.12

| | TYPE | FIRST OPTICAL DISK (CD) | SECOND OPTICAL DISK (SD) | | THIRD OPTICAL DISK (HSD) | |
|---|---|---|---|---|---|---|
| | | | SINGLE-SIDED RECORDING (SD1) | DOUBLE-SIDED RECORDING/SINGLE-SIDED READING (SD2) | SINGLE-SIDED RECORDING (HSD1) | DOUBLE-SIDED RECORDING/SINGLE-SIDED READING (HSD2) |
| RATED VALUES | READING SURFACE SIDE SUBSTRATE THICKNESS | 1.2mm (1.1~1.3mm) | 0.6mm (0.55~0.65mm) | | 0.6mm (0.55~0.65mm) | |
| | MINIMUM PIT LENGTH | 0.85 μm (0.70~1.0 μm) | 0.42~0.46 μm (0.35~0.50 μm) | | 0.25 μm (0.20~0.30 μm) | |
| | TRACK PITCH | 1.6 μm (1.5~1.7 μm) | 0.74 μm (0.69~0.79 μm) | | 0.50 μm (0.42~0.58 μm) | |
| | REFLECTION FACTOR | AT LEAST 70% | AT LEAST 70% | 20~40% | AT LEAST 70% | 20~40% |
| REPRODUCING CONDITIONS | SPOT DIAMETER | 1.5 μm (1.3~1.7 μm) | 0.9 μm (0.7~1.1 μm) | | 0.6 μm (0.4~0.8 μm) | |
| | NUMERICAL APERTURE | 0.25 (0.20~0.30) | 0.42 (0.30~0.55) | | 0.60 (0.55~0.65) | |
| | WAVELENGTH | | 430nm (350~450nm) | | | |

FIG. 13

| | | FIRST OPTICAL DISK (CD) | SECOND OPTICAL DISK (SD) | | THIRD OPTICAL DISK (HSD) | |
|---|---|---|---|---|---|---|
| | TYPE | | SINGLE-SIDED RECORDING (SD1) | DOUBLE-SIDED RECORDING/SINGLE-SIDED READING (SD2) | SINGLE-SIDED RECORDING (HSD1) | DOUBLE-SIDED RECORDING/SINGLE-SIDED READING (HSD2) |
| RATED VALUES | READING SURFACE SIDE SUBSTRATE THICKNESS | 1.2mm (1.1~1.3mm) | 0.6mm (0.55~0.65mm) | | 0.6mm (0.55~0.65mm) | |
| | MINIMUM PIT LENGTH | 0.85 μm (0.70~1.0 μm) | 0.42~0.46 μm (0.35~0.50 μm) | | 0.25 μm (0.20~0.30 μm) | |
| | TRACK PITCH | 1.6 μm (1.5~1.7 μm) | 0.74 μm (0.69~0.79 μm) | | 0.50 μm (0.42~0.58 μm) | |
| | REFRECTION FACTOR | AT LEAST 70% | AT LEAST 70% | 20~40% | AT LEAST 70% | 20~40% |
| REPRODUCING CONDITIONS | SPOT DIAMETER | 1.55 μm (1.35~1.75 μm) | 0.95 μm (0.75~1.15 μm) | | 0.8 μm (0.6~1.0 μm) | |
| | NUMERICAL APERTURE | 0.32 (0.25~0.40) | 0.48 (0.40~0.55) | | 0.60 (0.55~0.65) | |
| | WAVELENGTH | 532nm (450~550nm) | | | | |

FIG.14

| | TYPE | FIRST OPTICAL DISK (CD) | SECOND OPTICAL DISK (SD) | | THIRD OPTICAL DISK (HSD) | |
|---|---|---|---|---|---|---|
| | | | SINGLE-SIDED RECORDING (SD1) | DOUBLE-SIDED RECORDING/SINGLE-SIDED READING (SD2) | SINGLE-SIDED RECORDING (HSD1) | DOUBLE-SIDED RECORDING/SINGLE-SIDED READING (HSD2) |
| RATED VALUES | READING SURFACE SIDE SUBSTRATE THICKNESS | 1.2mm (1.1~1.3mm) | 0.6mm (0.55~0.65mm) | | 0.6mm (0.55~0.65mm) | |
| | MINIMUM PIT LENGTH | 0.85 μm (0.70~1.0 μm) | 0.42~0.46 μm (0.30~0.50 μm) | | 0.25 μm (0.20~0.30 μm) | |
| | TRACK PITCH | 1.6 μm (1.5~1.7 μm) | 0.74 μm (0.73~0.75 μm) | | 0.55 μm (0.5~0.6 μm) | |
| | REFLECTION FACTOR | AT LEAST 70% | AT LEAST 70% | 20~40% | AT LEAST 70% | 20~40% |
| REPRODUCING CONDITIONS | SPOT DIAMETER | 1.5 μm (1.4~1.6 μm) | 0.9 μm (0.85~0.95 μm) | | 0.65 μm (0.6~0.7 μm) | |
| | NUMERICAL APERTURE | 0.42 (0.30~0.55) | 0.60 (0.55~0.65) | | 0.60 (0.55~0.65) | |
| | WAVELENGTH | | 635nm (585~685nm) | | | |

FIG.15

| | TYPE | FIRST OPTICAL DISK (CD) | SECOND OPTICAL DISK (SD) | | THIRD OPTICAL DISK (HSD) | |
|---|---|---|---|---|---|---|
| | | | SINGLE-SIDED RECORDING (SD1) | DOUBLE-SIDED RECORDING/SINGLE-SIDED READING (SD2) | SINGLE-SIDED RECORDING (HSD1) | DOUBLE-SIDED RECORDING/SINGLE-SIDED READING (HSD2) |
| RATED VALUES | READING SURFACE SIDE SUBSTRATE THICKNESS | 1.2mm (1.1~1.3mm) | 0.6mm (0.55~0.65mm) | | 0.6mm (0.55~0.65mm) | |
| | MINIMUM PIT LENGTH | 0.85 μm (0.70~1.0 μm) | 0.42~0.46 μm (0.35~0.50 μm) | | 0.25 μm (0.20~0.30 μm) | |
| | TRACK PITCH | 1.6 μm (1.5~1.7 μm) | 0.74 μm (0.73~0.75 μm) | | 0.55 μm (0.5~0.6 μm) | |
| | REFLECTION FACTOR | AT LEAST 70% | AT LEAST 70% | 20~40% | AT LEAST 70% | 20~40% |
| REPRODUCING CONDITIONS | SPOT DIAMETER | 1.5 μm (1.3~1.7 μm) | 0.9 μm (0.85~0.95 μm) | | 0.65 μm (0.6~0.7 μm) | |
| | NUMERICAL APERTURE | 0.42 (0.30~0.55) | 0.60 (0.55~0.65) | | 0.60 (0.55~0.65) | |
| | WAVELENGTH | 650nm (600~700nm) | | | | |

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

ERROR SIGNAL STRENGTH

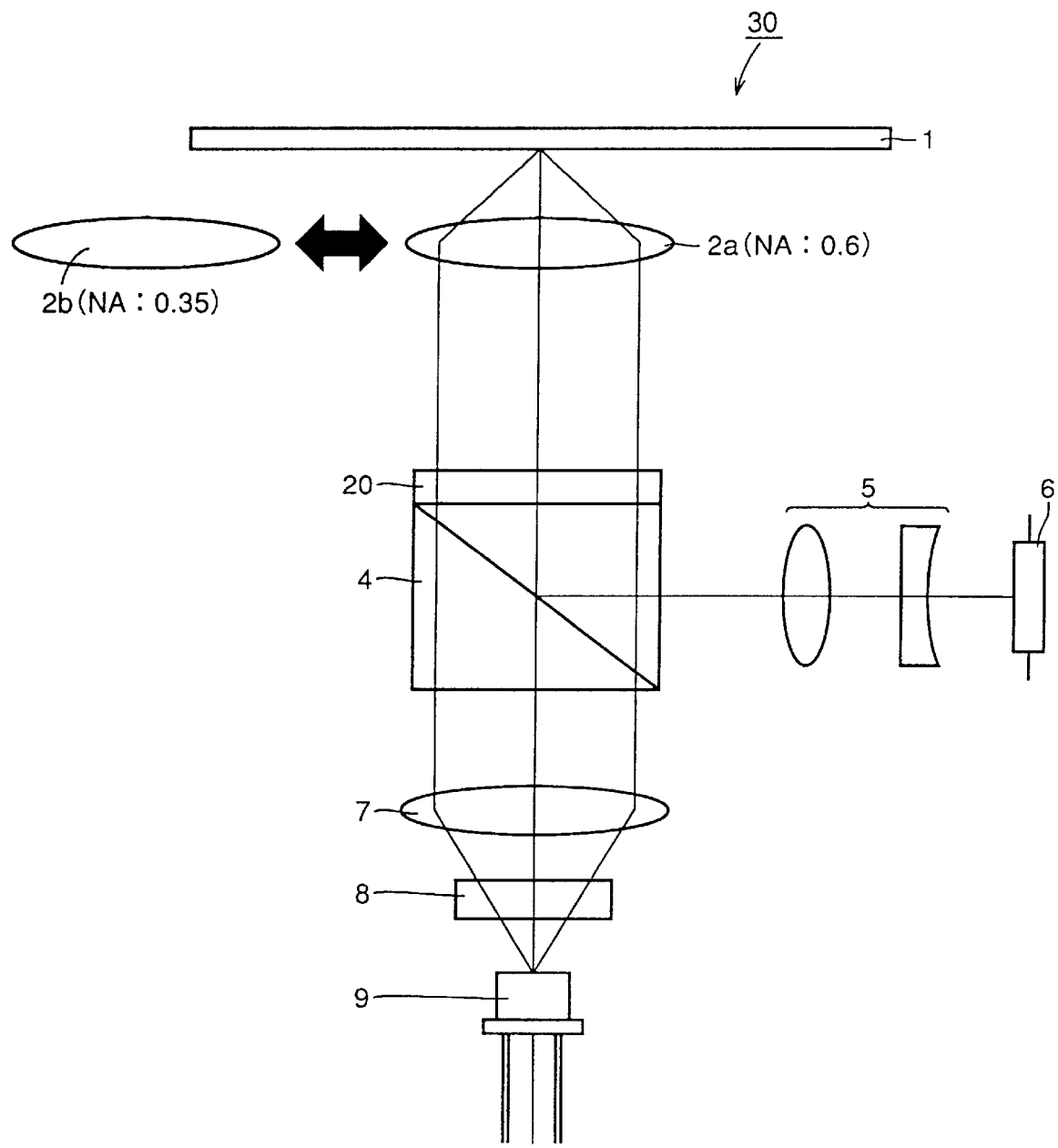

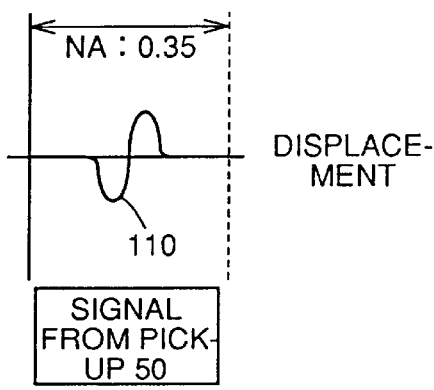
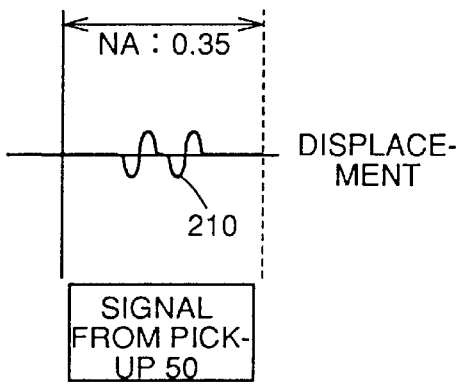

FIG.24a
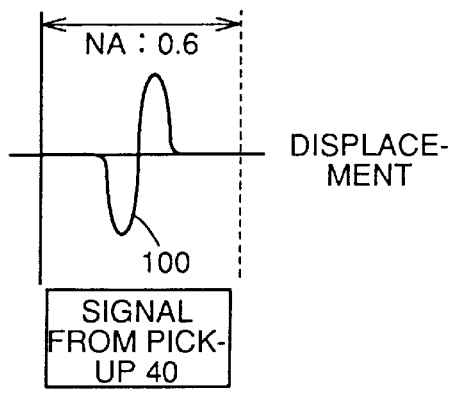
FIG.24b
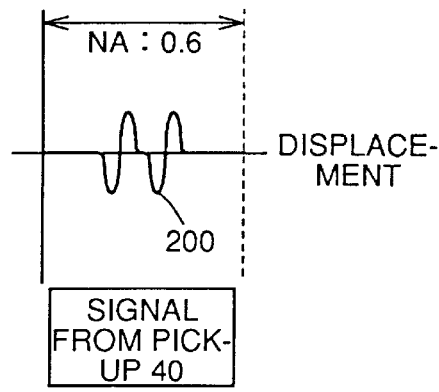
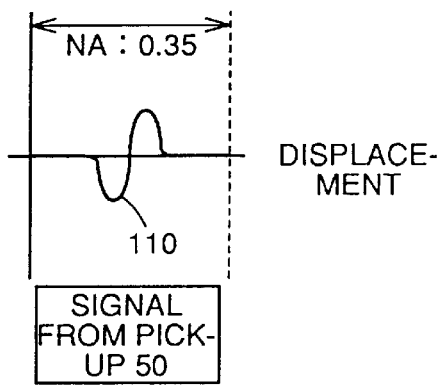
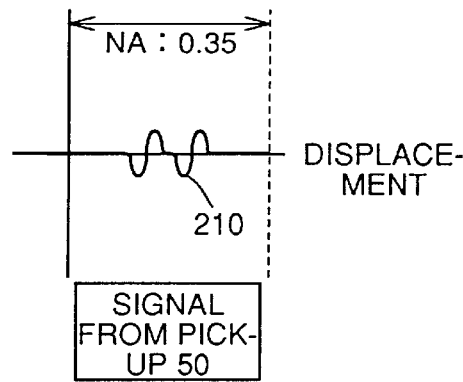
FIG.24c
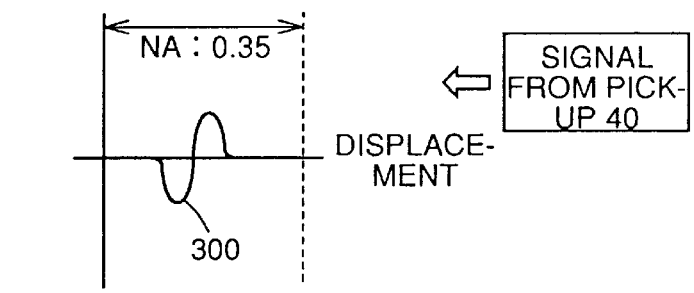
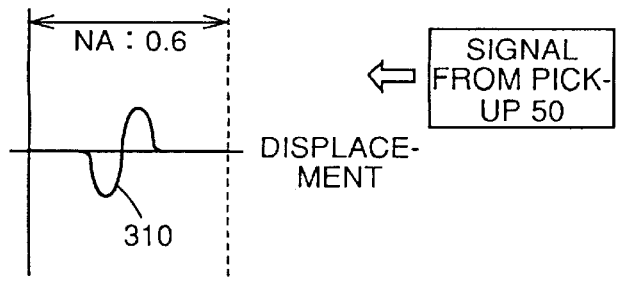

*FIG.25a* 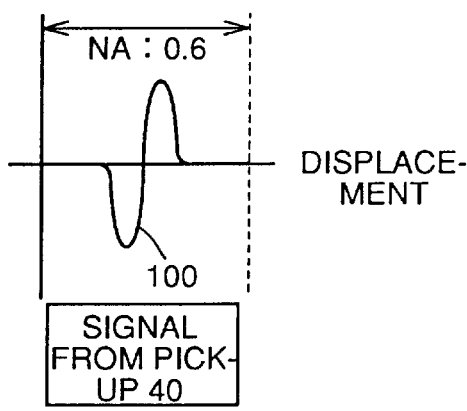 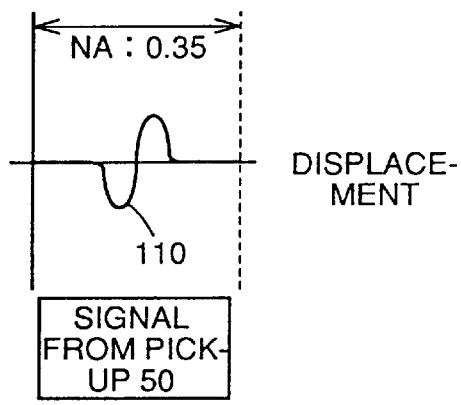
*FIG.25b* 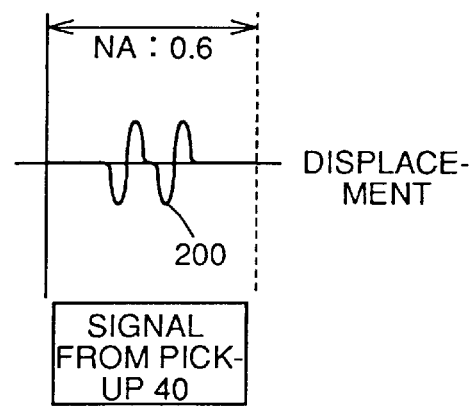 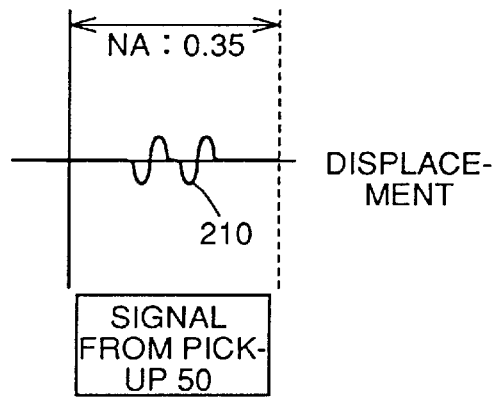

FIG.26a
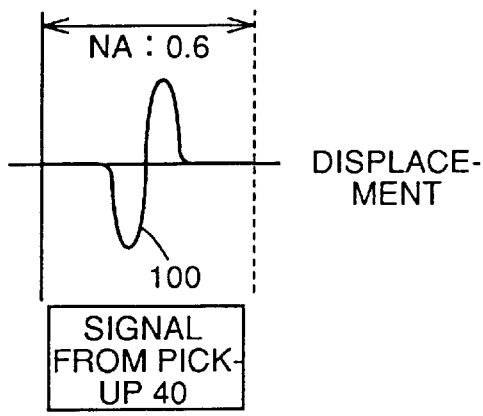
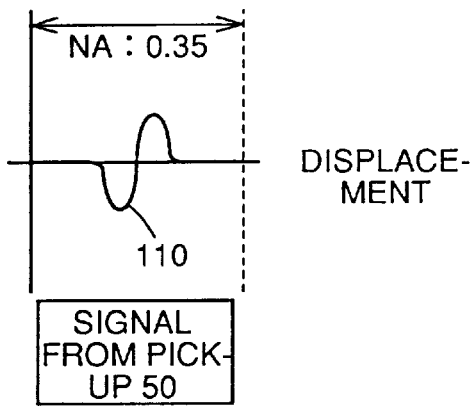
FIG.26b
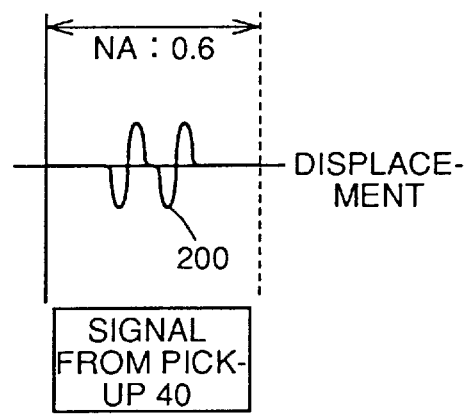
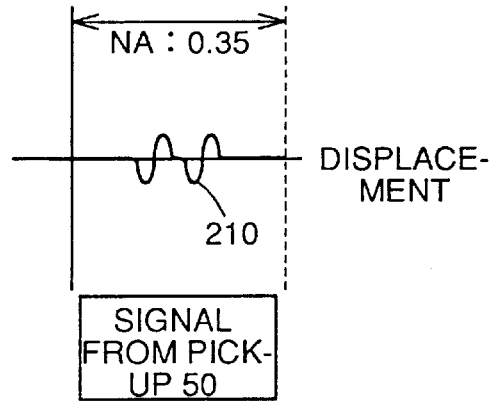

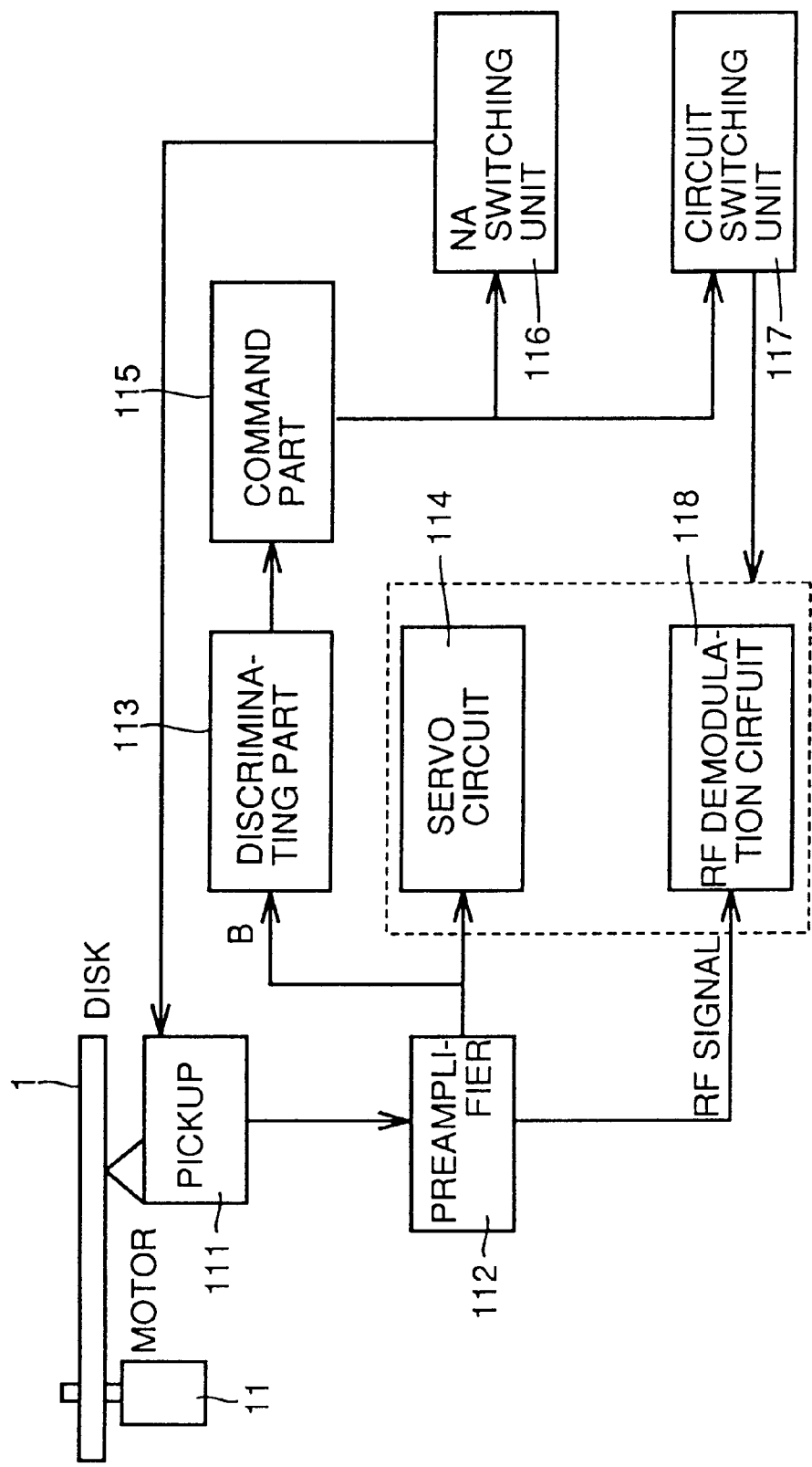

CD

SD

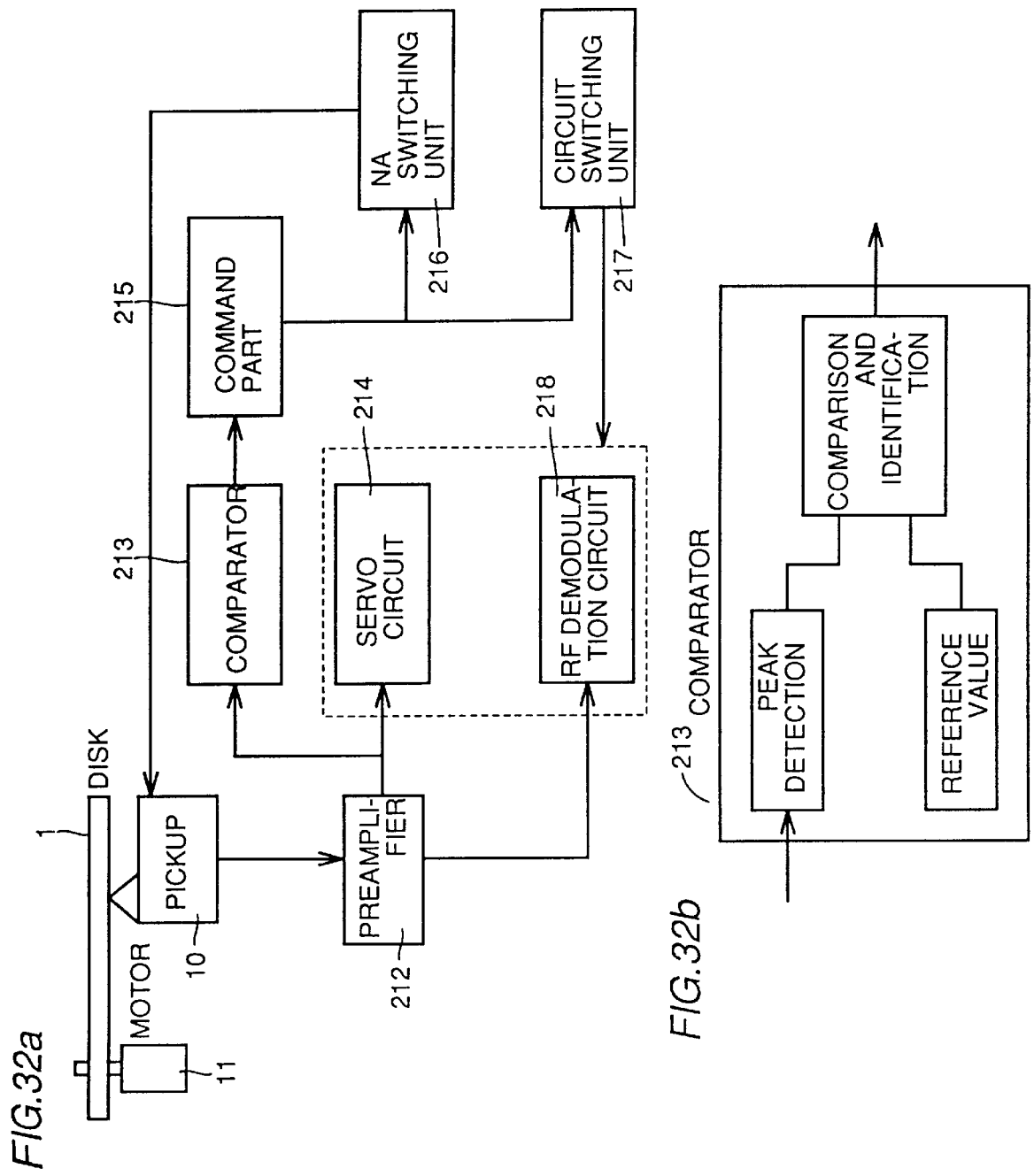

FIG.33

| TYPE | | FIRST OPTICAL DISK (CD) | FOURTH OPTICAL DISK (CD-R) | SECOND OPTICAL DISK (SD) | |
|---|---|---|---|---|---|
| | | | | SINGLE-SIDED RECORDING (SD1) | DOUBLE-SIDED RECORDING/ SINGLE-SIDED READING (SD2) |
| RATED VALUES | READING SURFACE SIDE SUBSTRATE THICKNESS | 1.2mm (1.1~1.3mm) | | 0.6mm (0.55~0.65mm) | 0.6mm (0.55~0.65mm) |
| | MINIMUM PIT LENGTH | 0.83 μm (0.80~0.90 μm) | | 0.40 μm (0.3~0.5 μm) | 0.40 μm (0.3~0.5 μm) |
| | TRACK PITCH | 1.6 μm (1.5~1.7 μm) | | 0.74 μm (0.73~0.75 μm) | 0.74 μm (0.73~0.75 μm) |
| | REFLECTION FACTOR | AT LEAST 70% | 10~50% | AT LEAST 70% | 20~40% |
| WAVELENGTH | | 635nm (585~690nm) | | | |

FIG.34

| | TYPE | FIRST OPTICAL DISK (CD) | FOURTH OPTICAL DISK (CD-R) | SECOND OPTICAL DISK (SD) | |
|---|---|---|---|---|---|
| | | | | SINGLE-SIDED RECORDING (SD1) | DOUBLE-SIDED RECORDING/ SINGLE-SIDED READING (SD2) |
| RATED VALUES | READING SURFACE SIDE SUBSTRATE THICKNESS | 1.2mm (1.1~1.3mm) | | 0.6mm (0.55~0.65mm) | 0.6mm (0.55~0.65mm) |
| | MINIMUM PIT LENGTH | 0.83 μm (0.80~0.90 μm) | | 0.40 μm (0.3~0.5 μm) | 0.40 μm (0.3~0.5 μm) |
| | TRACK PITCH | 1.6 μm (1.5~1.7 μm) | | 0.74 μm (0.73~0.75 μm) | 0.74 μm (0.73~0.75 μm) |
| | REFRECTION FACTOR | AT LEAST 70% | 10~50% | AT LEAST 70% | 20~40% |
| WAVELENGTH | | 650nm (600~700nm) | | | |

APPARATUS FOR DISCRIMINATING OPTICAL RECORDING MEDIA OF DIFFERENT THICKNESSES FROM EACH OTHER AND REPRODUCING INFORMATION THEREFROM

BACKGROUND OF THE INVENTION

1. Field of the Invention

The present invention relates to an apparatus for discriminating a plurality of types of optical disks having different substrate thicknesses from each other and reproducing information therefrom, and more particularly, it relates to an apparatus for identifying each optical disk by a reproducing signal for the optical disk.

2. Description of the Background Art

There is provided an optical disk, such as a CD-ROM, having a thickness of about 1.2 mm for reading information with a semiconductor laser. In this type of optical disk, focus servo control and tracking servo control are performed on a pickup objective lens thereby irradiating a pit train of a signal recording surface with a laser beam and reproducing signals. In recent years, high densification progresses for recording dynamic images for a long time.

For example, an SD standard for recording information of about 5 Gbytes on a single side of an optical disk having the same diameter of 12 cm as a CD-ROM has been proposed. A single SD which is prepared by bonding two SDs each having a thickness of about 0.6 mm to each other can record information of about 10 Gbytes.

Japanese Patent Laying-Open No. 5-303766 (1993) proposes an apparatus for enabling reproduction of information from a high density optical disk provided with a thin substrate having a thickness of 0.6 mm and from a standard density optical disk provided with a substrate having a standard thickness of 1.2 mm with a single optical pickup.

This apparatus employs an objective lens having a numerical aperture of 0.6, which is designed to reproduce information from a high-density disk with a shorter-wavelength laser beam. An aperture for shielding an aberration corrector from an outer peripheral side of the laser beam thereby reducing the effective numerical aperture in case of reproducing information from an optical disk having a standard thickness and a standard density is inserted in a light source side of the objective lens.

In order to reproduce information from an SD as well as from a CD with a single pickup, it is important to identify the type of each optical disk which is set on a reproducing apparatus. Japanese Patent Laying-Open No. 6-259804 (1994) discloses a method related to this type of technique. This method is adapted to irradiate optical disks with light through an optical pickup, for discriminating the optical disks from each other by detecting differences between positions of reflected light from the optical disks.

In the technique disclosed in Japanese Patent Laying-Open No. 6-259804, each optical disk is irradiated with a beam emitted from a semiconductor laser unit which is stored in the optical pickup through an objective lens so that the optical disk is identified by the detected position of the reflected light. Thus, the operation for identifying each optical disk is required before starting an operation of reproducing information from the optical disk. Thus, the optical disk cannot be quickly identified. Further, a deflected optical disk cannot be correctly identified due to an influence of the deflection, since the position of the reflected light is detected.

SUMMARY OF THE INVENTION

Accordingly, an object of the present invention is to provide an apparatus for discriminating optical disks from each other and reproducing information therefrom, which can quickly and correctly identify each optical disk for thereafter reproducing information from the same.

Another object of the present invention is to provide an apparatus for discriminating optical disks from each other and reproducing information therefrom, which can identify each optical disk for thereafter reproducing information from the same in a simple structure.

Still another object of the present invention is to provide a method of quickly and correctly identifying each optical disk.

A further object of the present invention is to provide a method of quickly and correctly identifying each optical disk through the characteristics of a reproducing signal for the optical disk.

The aforementioned objects can be attained by an apparatus for discriminating optical disks from each other including the following elements:

The inventive apparatus for discriminating optical recording media from each other and reproducing information therefrom includes an optical pickup for picking up control signals necessary for reproduction from optical recording media having different thicknesses, a discriminator for discriminating the types of the optical recording media on the basis of the picked-up control signals, and a reproducer for reproducing information from the optical recording media with the pickup.

The optical pickup picks up the control signals necessary for reproduction from the optical recording media having different thicknesses for discriminating the optical recording media on the basis of the signals and reproducing information therefrom, whereby an apparatus for discriminating optical recording media from each other and reproducing information therefrom which can quickly and correctly discriminate various types of optical disks from each other and thereafter reproduce information therefrom can be provided.

Preferably, the optical pickup includes a first optical pickup including an objective lens having a first numerical aperture and a second optical pickup including an objective lens having a second numerical aperture which is different from the first numerical aperture.

In another aspect of the present invention, a method of discriminating the types of a plurality of optical recording media and reproducing information therefrom includes the steps of preparing a pickup which can pick up control signals necessary for reproduction from the optical recording media having different thicknesses, discriminating the types of the optical recording media on the basis of the picked-up signals, and reproducing information from the optical recording media with the pickup on the basis of the results of the discrimination.

The control signals necessary for reproduction are picked up from the optical recording media having different thicknesses and the types of the optical recording media are discriminated on the basis of the picked-up control signals so that information is reproduced from the optical recording media on the basis of the results of the discrimination, whereby a method which can quickly and correctly discriminate optical recording media having different thicknesses from each other and reproduce information therefrom can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows rated values of and reproducing conditions for various types of optical disks in case of employing a laser beam of 350 to 450 nm in wavelength;

FIG. 2 shows rated values of and reproducing conditions for various types of optical disks in case of employing a laser beam of 450 to 550 nm in wavelength;

FIG. 3 shows rated values of and reproducing conditions for various types of optical disks in case of employing a laser beam of 585 to 685 nm in wavelength;

FIG. 4 shows rated values of and reproducing conditions for various types of optical disks in case of employing a laser beam of 600 to 700 nm in wavelength;

FIG. 12 shows other rated values of and reproducing conditions for various types of optical disks in case of employing a laser beam of 350 to 450 nm in wavelength;

FIG. 13 shows other rated values of and reproducing conditions for various types of optical disks in case of employing a laser beam of 450 to 550 nm in wavelength;

FIG. 14 shows other rated values of and reproducing conditions for various types of optical disks in case of employing a laser beam of 585 to 685 nm in wavelength;

FIG. 15 shows other rated values of and reproducing conditions for various types of optical disks in case of employing a laser beam of 600 to 700 nm in wavelength;

FIG. 21 is a model diagram showing a pickup having two objective lenses capable of compatible reproduction which is employed in an embodiment 4e;

FIGS. 24a to 24c illustrate S-curve waveforms of focus error signals of various types of optical disks;

FIGS. 25a and 25b illustrate S-curve waveforms of focus error signals of various types of optical disks;

FIGS. 26a and 26b illustrate S-curve waveforms of focus error signals of various types of optical disks;

FIG. 27 is a block diagram of a reproducing apparatus in the fourth embodiment;

FIGS. 32a and 32b are block diagrams showing the reproducing apparatus according to the fifth embodiment;

FIG. 33 is a table showing rated values of various optical disks with respect to wavelengths of 585 to 690 nm in a sixth embodiment of the present invention;

FIG. 34 is a table showing rated values of various optical disks with respect to wavelengths of 600 to 700 nm in the sixth embodiment;

DESCRIPTION OF THE PREFERRED EMBODIMENTS

Embodiments of the present invention are now described with reference to the drawings. Referring to the uppermost part of FIG. 1, a standard density optical disk, i.e., a CD or a CD-ROM (first optical disk) provided with a substrate having a standard thickness of 1.2 mm (allowance: ±0.1 mm, identical for the rest), high density optical disks, i.e., SDs (second optical disks) each provided with a thin substrate having a thickness of 0.6 mm (allowance: ±0.05 mm, identical for the rest), and superhigh density optical disks, i.e., high density SDs (third disks or HSDs) each provided with a thin substrate having a thickness of 0.6 mm (allowance: ±0.05 mm, identical for the rest) are discriminated from each other so that information is reproduced therefrom. The second and third disks include optical disks SD1 and HSD1 for single-sided recording and optical disks SD2 and HSD2 for double-sided recording and single-sided reading Minimum pit lengths, track pitches and reflectivity of the respective optical disks are shown in the upper half of FIG. 1. Pit depths (physical depths) of the first, second and third optical disks are 110 (90 to 130) nm, 105 (95 to 115) nm and 72 (62 to 82) nm, respectively. The diameters of the respective optical disks are 40 to 120 mm.

Reproducing conditions for the respective disks (such as, beam spot diameters and numerical apertures NA of objective lenses in the case of reproducing information from the aforementioned disks with a laser beam having a wavelength of 430 nm (typical wavelength: 350 to 450 nm, identical for the rest)) are shown in the lower half of FIG. 1. The present invention is adapted to discriminate a plurality of optical disks having different substrate thicknesses, different track pitches and different reflectivity from recording surfaces as described above, from each other.

FIG. 2 shows beam spot diameters and numerical apertures NA of objective lenses of the first, second and third optical disks in case of employing a laser beam having a wavelength of 450 to 550 nm (typical wavelength: 517 to 547 nm, identical for the rest). Further, FIGS. 3 and 4 show beam spot diameters and numerical apertures NA of objective lenses of the first, second and third optical disks in case of employing laser beams having wavelengths of 585 to 690 nm (typical wavelength: 620 to 650 nm, identical for the rest) and 600 to 700 nm (typical wavelength: 635 to 665 nm, identical for the rest), respectively.

(1) First Embodiment (A) Discriminating Method and Discriminating Apparatus

Figure 5A:
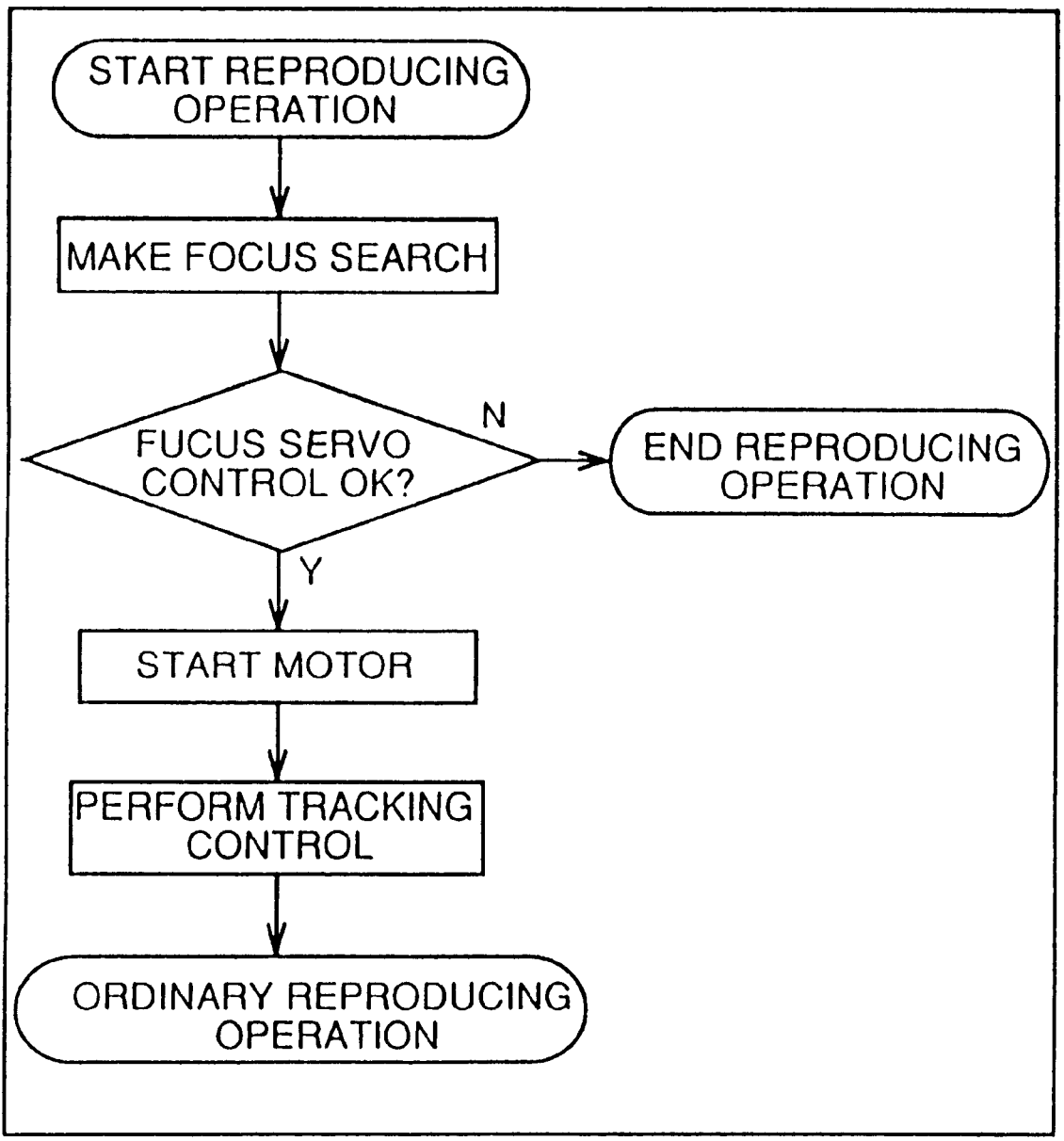
FIGS. 5a and 5b are flow charts showing operations for reproducing information from optical disks in the prior art and a first embodiment of the present invention respectively.
Figure 5B:
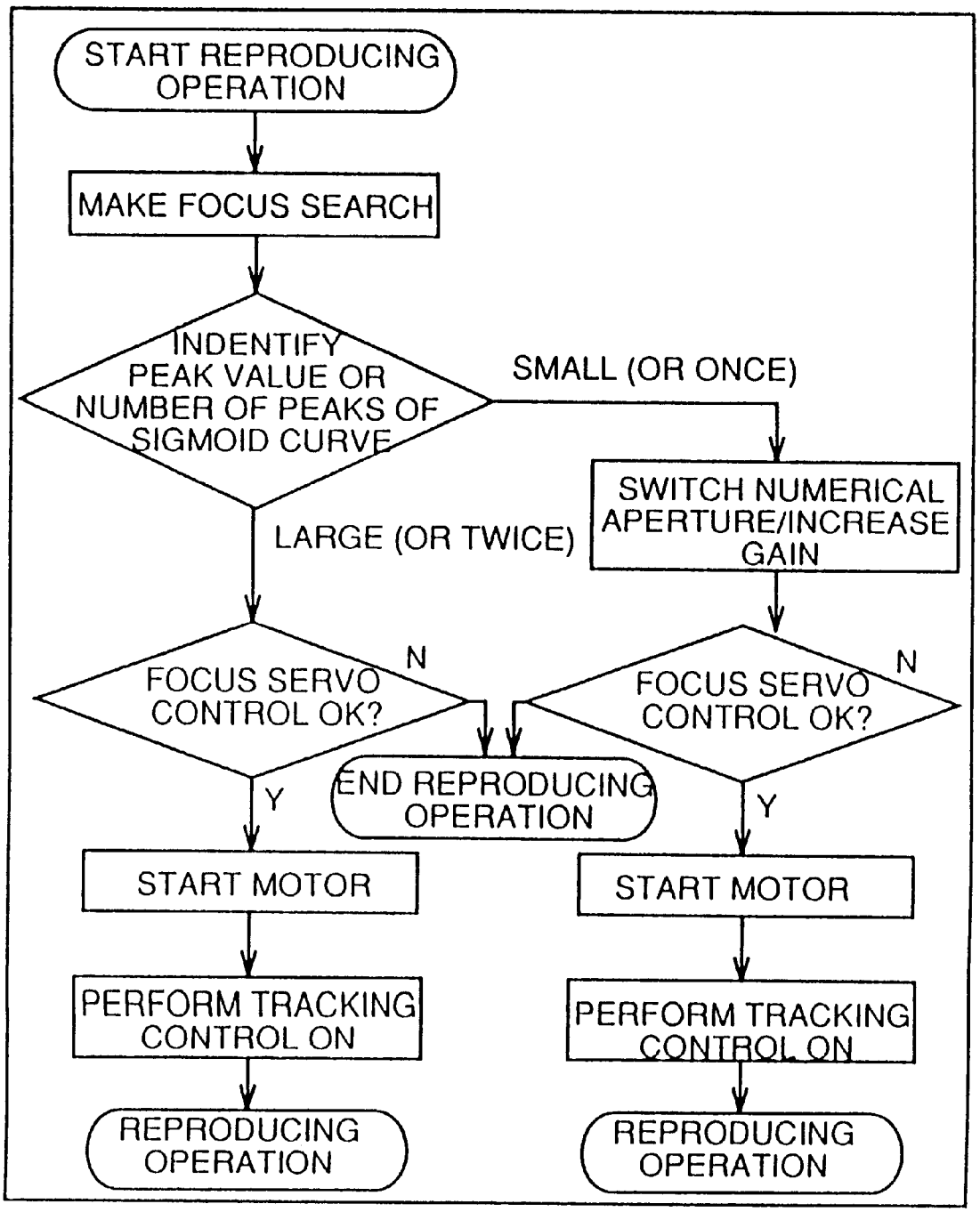
Figure 7A:
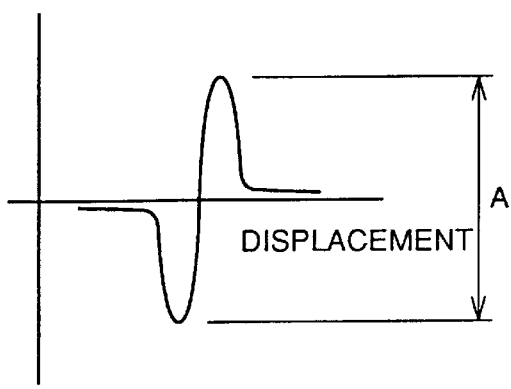
FIGS. 7a to 7c illustrate S-curves of focus error signals of various types of optical disks.
Figure 7B:
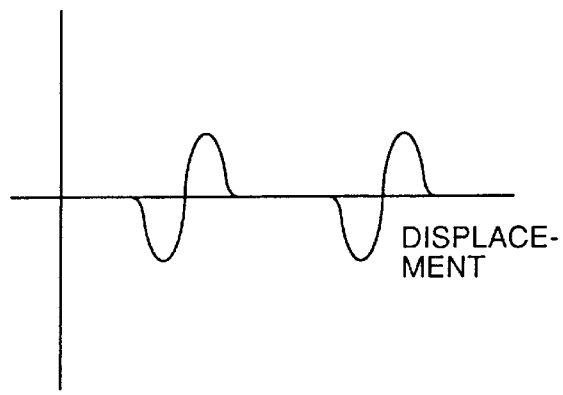
Figure 7C:
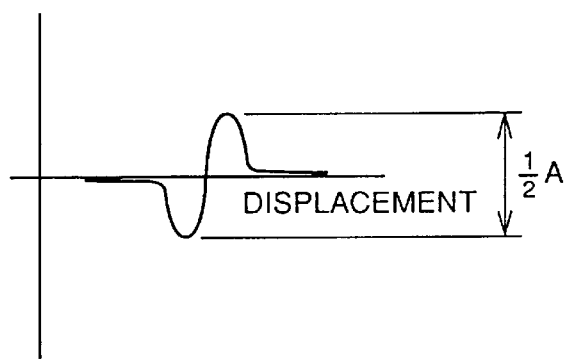

FIGS. 5a and 5b are flow charts showing processes from reproducing operation starts up to reproducing operations in the prior art and a first embodiment of the present invention respectively. The operations of reproducing information from optical disks with optical pickups are performed as follows: In the prior art, the reproducing operation is started when each optical disk is mounted, for making a focus search, and performing focus servo control. If the focus servo control does not receive an OK, the reproducing operation is ended. If the focus servo control receives the OK, on the other hand, a motor is started to perform tracking control, as at to start an ordinary reproducing operation. According to the first embodiment, on the other hand, each optical disk is identified by detecting the peak value of a S-curve of a focus error signal depending on the type of the mounted optical disk, for reproducing or recording information from or in the optical disk in response to the identified optical disk. In the first embodiment, a focus search may be made after starting a motor. In the flow chart of the present invention, therefore, a function for identifying the optical disk is added before a step of determining whether or not focus servo control receives the OK as compared to the prior art, as shown in FIG. 5b. Despite the addition of this identifying function, the time up to an operation of reproducing information from the optical disk is not increased as compared to the prior art. Namely, the type of the mounted optical disk is identified in a period corresponding to that between mounting of the optical disk and the focus servo control in the conventional operation of reproducing information from the optical disk. S-curves of focus error signals in the aforementioned focus search for optical disks can be classified into three types, as shown in FIGS. 7a, 7b and 7c. FIGS. 7a and 7b illustrate S-curves in the SD1 and the SD2 respectively, and FIG. 7c illustrates an S-curves in the CD. These figures show S-curves measured with an objective lens for an optical disk with a substrate thickness of 0.6 mm having a numerical aperture NA of 0.6 (allowance: ±0.05, identical for the rest). When the S-curve of the CD is measured with this objective lens, the light quantity which can be effectively utilized is reduced and hence the peak value of the S-curve of the CD is about half that of the S-curve of the SD1 shown in FIG. 7a, as shown in FIG. 7c. Each peak value of the S-curve of the SD2 is reduced since the reflection factor of the SD2 is about 30% of that of the SD1, while the peaks appear twice since the SD2 has two layers of recording surfaces, whereby the SD2 can be discriminated from the SD1. This also applies to the case of the high density optical disk (HSD1) of single-sided recording and the optical disk (HSD2) of double-sided recording and single-sided reading. The SD2, the HSD2 and the CD can be discriminated from each other through the differences between the peak values of the S-curves. In other words, an S-curve having a large peak value indicates an SD or an HSD, and that having a small peak value indicates a CD.

Figure 6:
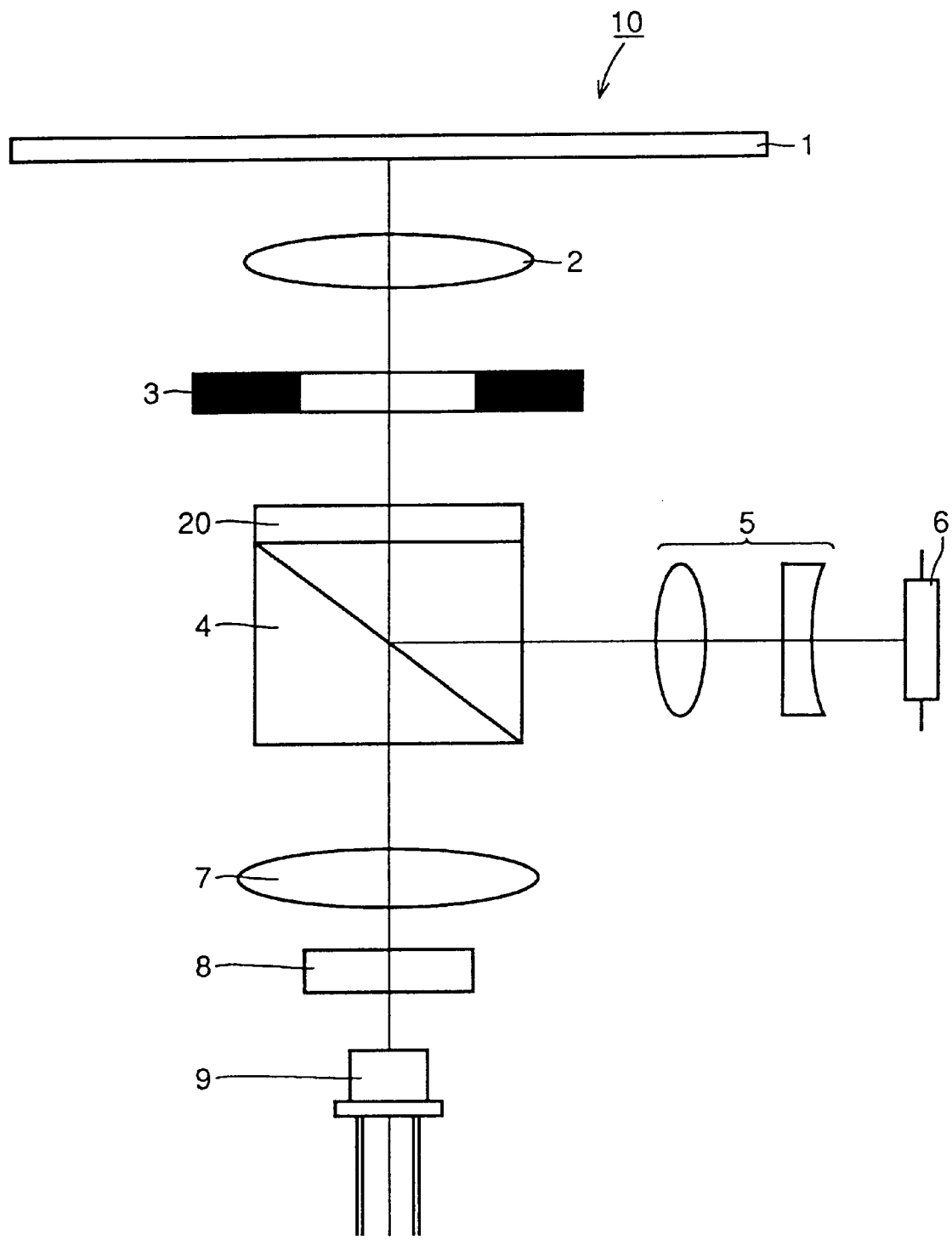
FIG. 6 is a model diagram showing a pickup capable of compatible reproduction which is employed in the present invention.

A reproducing apparatus employed for reproducing information from optical disks has a function of reproducing information from a plurality of target optical disks. FIG. 6 shows an optical pickup 10 which is employed in the present invention. A beam emitted from a semiconductor laser unit 9 passes through a diffraction grating 8, a collimator lens 7, a polarizing beam splitter 4, a quarter-wave plate 20 and an aperture 3, and is condensed by an objective lens 2 to be applied to each optical disk 1. The beam reflected by the optical disk 1 returns through the objective lens 2, the aperture 3 and the quarter-wave plate 20, and is reflected by the polarizing beam splitter 4 in a direction which is at an angle of 90° to the direction of the incident beam, to be detected by a photodetector 6 through a condenser lens group 5. This optical pickup 10 is adapted to reproduce information from both of CDs and SDs; and hence, the aperture 3 which is inserted between the objective lens 2 and the polarizing beam splitter 4 can change the effective numerical aperture NA. A CD and an SD have different distances of 1.2 mm and 0.6 mm between substrate surfaces and signal recording surfaces respectively and a single objective lens cannot focus beams on the signal recording surfaces which are at such different distances. Therefore, the effective numerical aperture NA is varied with the distances between the substrate surfaces and the signal recording surfaces, so that the beams can be focused on the signal recording surfaces which are at different distances. The effective numerical aperture NA can be changed by a mechanical, electrical or magnetic method.

In order to electrically change the effective numerical aperture NA, a polarization plane switching unit for rotating the plane of polarization of the laser beam and a polarization selecting unit for selectively shading an outer side of the laser beam passing through the polarization plane switching unit are applied to the aperture 3, while the polarization plane switching unit and the polarization selecting unit are prepared from liquid crystals. The polarization selecting unit is prepared from guest-host type liquid crystals, for example, and the polarization plane switching unit is prepared from TN liquid crystals, STN liquid crystals or ferroelectric liquid crystals, for example. Alternatively, the polarization plane switching unit may be prepared from a Pockels cell.

In order to mechanically change the effective numerical aperture NA, the polarization plane switching unit is prepared from a quarter-wave plate, and the polarization selecting unit is prepared from a polar screen, a polarization selective holograph or polarized glass, for example. In order to magnetically change the effective numerical aperture NA, on the other hand, the polarization plane selecting unit is prepared from a Faraday element, for example.

On the other hand, a half mirror may be employed in place of the polarizing beam splitter 4 and the quarter-wave plate 20. Further, the aperture 3 is not restricted to the position between the quarter-wave plate 20 (half mirror) and the objective lens 2, but may be located in any position between the semiconductor laser unit 9 and the objective lens 2. The optical pickup 10 having the aforementioned structure is employed for detecting the peak value of an S-curve of a focus error signal by the photodetector 6, thereby identifying each optical disk.

The discriminating method is now described in more concrete terms.

(1a) Discrimination of CD and SD1

When an optical disk is mounted and thereafter a focus search is started, the objective lens 2 of the optical pickup 10 starts a vertical movement, so that the photodetector 6 detects the S-curve shown in FIG. 7a or 7c. At this time, the effective numerical aperture NA of the objective lens 2 is set at 0.6 by the aperture 3. While all light quantity of the applied laser beam can be utilized in case of the SD1 having a substrate thickness of 0.6 mm, not all light quantity can be utilized in case of the CD since the effective numerical aperture NA of the objective lens 2 is set at 0.6, and hence the peak value of the S-curve of the CD is small even if the reflection factor of the recording surface is at least 70% identically to the SD1. Therefore, the SD1 is identified if the peak value of the detected S-curve is large, while the CD is identified if the peak value is small.

(1b) Discrimination of CD and SD2

When an optical disk is mounted and thereafter a focus search is started, the objective lens 2 of the optical pickup 10 starts a vertical movement, so that the photodetector 6 detects the S-curve(s) shown in FIG. 7b or 7c. Also in this case, the effective numerical aperture NA of the objective lens 2 is set at 0.6 by the aperture 3. While all light quantity of the applied laser beam can be utilized in case of the SD2 having a substrate thickness of 0.6 mm, two S-curves are detected due to two layers of recording surfaces, although these S-curves are smaller than that of the SD1 due to the small reflection factor of about 30%. In case of the CD, on the other hand, the peak value of the S-curve is small similarly to those of the SD2, since not all light quantity can be utilized for the aforementioned reason. Therefore, these optical disks can be discriminated from each other through the numbers of the detected S-curves, such that the SD2 is identified if two S-curves are detected, while the CD is identified if a single S-curve is detected. In other words, peak values are detected twice in the process of approach of the objective lens 2 to the optical disk 1 in case of the SD2, while the peak value is detected only once in case of the CD. Thus, these optical disks can be discriminated from each other through the numbers of the detected peak values.

Thus, optical disks having different substrate thicknesses can be discriminated from each other also by detecting the numbers of peaks of S-curves.

(1c) Discrimination of SD1 and SD2

When an optical disk is mounted and thereafter a focus search is started, the objective lens 2 of the optical pickup 10 starts a vertical movement, so that the photodetector 6 detects the S-curve(s) shown in FIG. 7a or 7b. In this case, the peak values of the detected S-curves differ from each other due to the different reflectivity of the optical disks. The SD2 has a reflection factor of about 30% which is smaller than that of the SD1, and hence the peak values of its S-curves are small. Therefore, the SD1 is identified if the peak value of the S-curve is large, while the SD2 is identified if the peak values of the S-curves are small. In this case, further, the optical disks can be discriminated from each other also through the numbers of the peaks of the S-curves. Namely, the peaks are detected twice in the process of approach of the objective lens 2 to the optical disk 1 in case of the SD2, whereby the SD2 is identified if the photodetector 6 detects two peak values, while the SD1 is identified if the photodetector 6 detects a single peak value.

(1d) Discrimination of CD and HSD1

When an optical disk is mounted and thereafter a focus search is started, the objective lens 2 of the optical pickup 10 starts a vertical movement, so that the photodetector 6 detects the S-curve shown in FIG. 7a or 7c. At this time, the effective numerical aperture NA of the objective lens 2 is set at 0.6 by the aperture 3. While all light quantity of the applied laser beam can be utilized in case of the HSD1 having a substrate thickness of 0.6 mm, not all light quantity can be utilized in case of the CD since the effective numerical aperture NA of the objective lens 2 is set at 0.6; and hence, the peak value of the S-curve of the CD is small even if the reflection factor of the recording surface is at least 70% identically to the HSD1. Therefore, the HSD1 is identified if the peak value of the detected S-curve is large, while the CD is identified if the peak value is small.

(1e) Discrimination of CD and HSD2

When an optical disk is mounted and thereafter a focus search is started, the objective lens 2 of the optical pickup 10 starts a vertical movement, so that the photodetector 6 detects the S-curve(s) shown in FIG. 7b or 7c. Also in this case, the effective numerical aperture NA of the objective lens 2 is set at 0.6 by the aperture 3. While all light quantity of the applied laser beam can be utilized in case of the HSD2 having a substrate thickness of 0.6 mm, two S-curves are detected due to two layers of recording surfaces, although these S-curves are smaller than that of the SD1 due to the small reflection factor of about 30%. In case of the CD, on the other hand, the peak value of the S-curve is small similarly to those of the HSD2, since not all light quantity can be utilized for the aforementioned reason. Therefore, these optical disks can be discriminated from each other through the numbers of the detected S-curves, such that the HSD2 is identified if two S-curves are detected, while the CD is identified if a single S-curve is detected.

(1f) Discrimination of HSD1 and HSD2

When an optical disk is mounted and thereafter a focus search is started, the objective lens 2 of the optical pickup 10 starts a vertical movement, so that the photodetector 6 detects the S-curve(s) shown in FIG. 7a or 7b. In this case, all light quantity of the applied laser beam can be utilized and hence the peak value of the S-curve of the HSD1 is larger than those of the HSD2 due to the difference between the recording surfaces. Therefore, the HSD1 is identified if the peak value of the S-curve detected by the photodetector 6 is large, while the HSD2 is identified if the peak values of the S-curves are small. Furthermore, in such a case, further, the optical disks can also be discriminated from each other through the numbers of the peaks of the S-curves. That is, the peaks are detected twice in the process of approach of the objective lens 2 to the optical disk 1 in case of the HSD2, whereby the HSD2 is identified if the photodetector 6 detects two peak values, while the HSD1 is identified if the photodetector 6 detects a single peak value.

Further, the SD1 and the HSD2, as well as the HD1 and the HSD2 can also be discriminated from each other by detecting the levels or numbers of the peak values of the S-curves.

As hereinabove described, the CD and the SD1, the CD and the SD2, the CD and the HSD1, the CD and the HSD2, the SD1 and the SD2 and the HSD1 and the HSD2 can be discriminated from each other through the peak values or the numbers of the peak values of the S-curves of the focus error signals.

In each of the aforementioned embodiments 1a to 1f, the optical disks can be discriminated from each other with a laser beam having a wavelength of 350 to 700 nm (preferably, 650 (600 to 700) nm, 635 (585 to 690) nm, 500 (450 to 550) nm; or 400 (350 to 450) nm, and more preferably, 415 to 445 nm, 517 to 547 nm, 620 to 650 nm or 635 to 665 nm).

The beam is not restricted to a circular shape, but may have an elliptical shape, or any of polygonal shapes shown in FIGS. 9a to 9g.

(1g) Discrimination of SD1 (HSD1) and SD2 (HSD2)

Description is now made on an operation of discriminating an SD1 or an HSD1 and an SD2 or an HSD2 from each other for reproducing information in response to each optical disk. In this case, S-curves of SD1 and HSD1 or SD2 and HSD2 detected by the photodetector 6 of the optical pickup 10 have peaks which are at the same values; and hence, the optical disks are discriminated from each other through the numbers of the detected peaks. The SD1 or the HSD1 is identified if the photodetector 6 detects a single peak value, while the SD2 or the HSD2 is identified if the photodetector 6 detects two peak values.

(1h) Discrimination including CD-R, a write-once optical disk having substrate thickness of 1.2 mm A CD-R (hereinafter referred to as "fourth optical disk", as the case may be for the concrete characteristics thereof is an optical disk having a minimum pit length of 0.83 μm (0.80 to 0.90 μm), a track pitch of 1.6 μm (1.5 to 1.7 μm), and a reflection factor of 10 to 50% with respect to a laser beam having a wavelength of 635 nm (585 to 685 nm) or 650 nm (600 to 700 nm).

FIGS. 10a to 10d illustrate focus error signals of an SD1 or an HSD1, an SD2 or an HSD2, a CD, and a CD-R in case of employing an objective lens having a numerical aperture NA of 0.6 for a substrate thickness of 0.6 mm respectively. The SD1 or the HSD1, the SD2 or the HSD2 and the CD exhibit focus error signal strength values which are similar to those described with reference to the above items (1a) to (1f). On the other hand, the focus error signal strength of the CD-R is 5 to 40% of that of the CD. This is because not all light quantity of the applied laser beam can be utilized since the numerical aperture NA of the objective lens is designed for an optical disk with the substrate thickness of 0.6 mm, and the optical disk has a low reflection factor of 10 to 50%. Therefore, it is possible to discriminate the CD-R and the CD as well as the SD1 or the HSD1 and the SD2 or the HSD2 from each other by detecting the focus error signals of the optical disks in focusing. Each optical disk can be identified through the focus error signal strength, with a laser beam having a wavelength of 635 nm (585 to 690 nm) or 650 nm (600 to 700 nm).

(B) Operation from Identification to Reproduction

Figure 8:
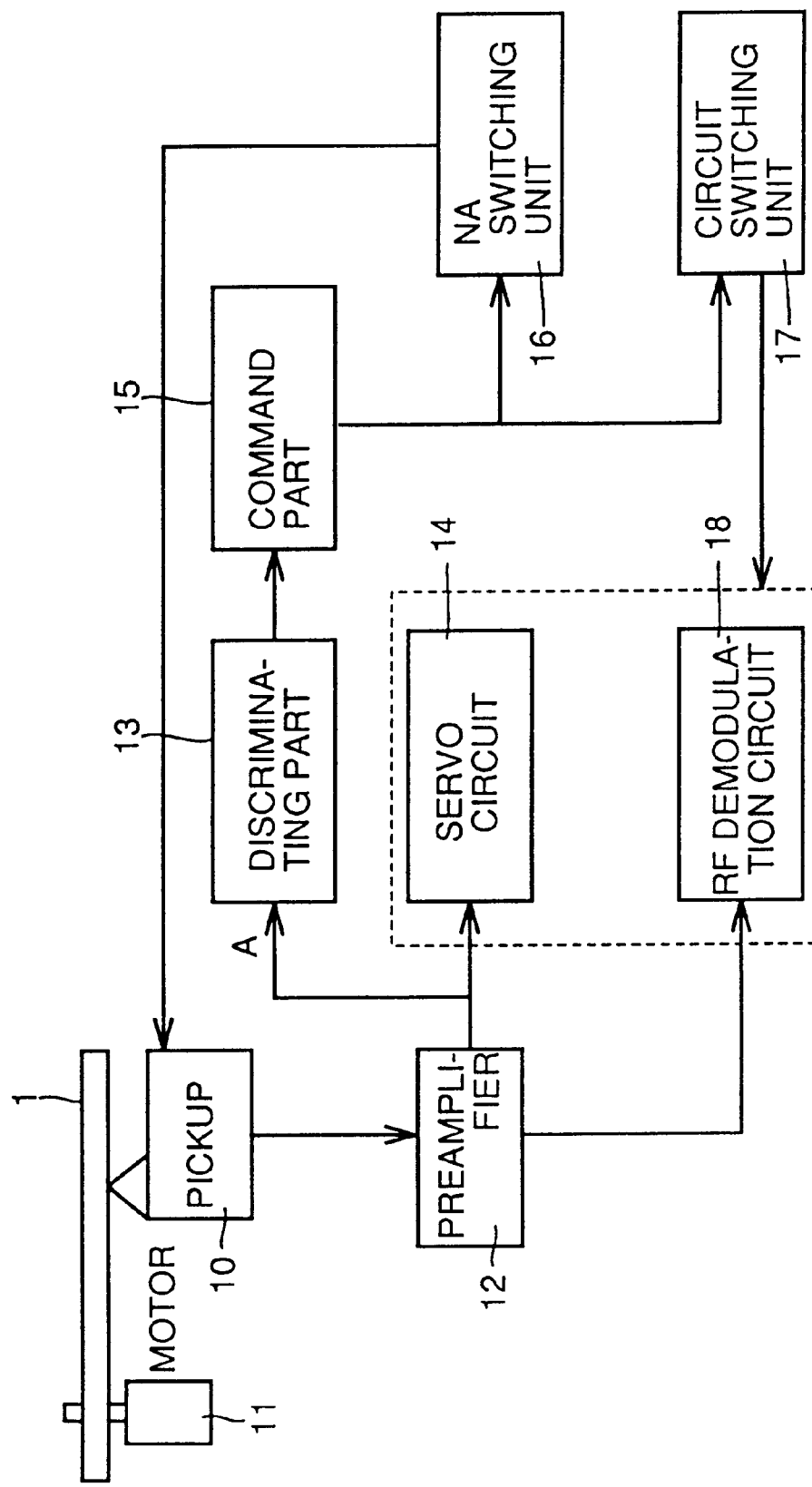
FIG. 8 is a block diagram showing a reproducing apparatus according to the first embodiment.
Figure 9A:
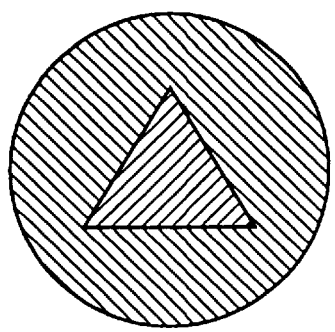
FIGS. 9a to 9g illustrate shapes of laser beams.
Figure 9E:
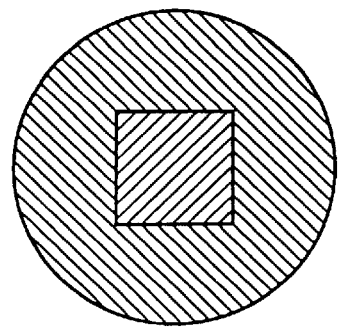
Figure 9B:
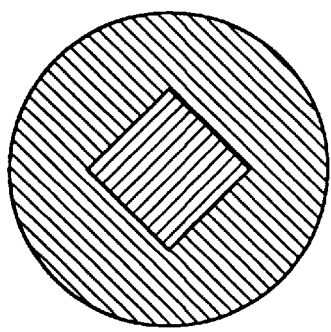
Figure 9F:
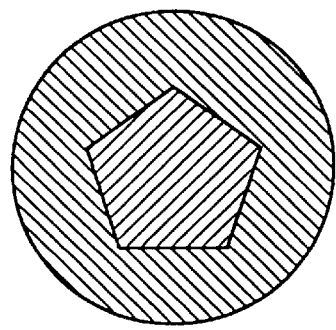
Figure 9C:
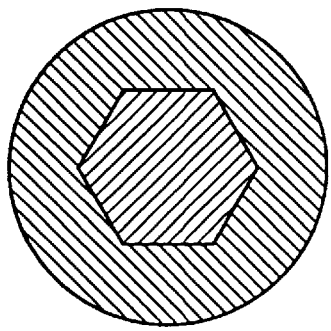
Figure 9G:
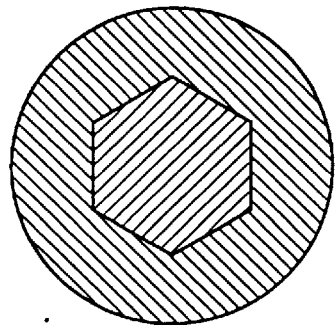
Figure 9D:
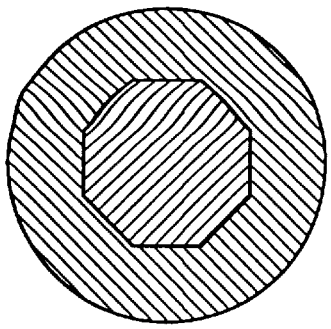
Figure 10A:
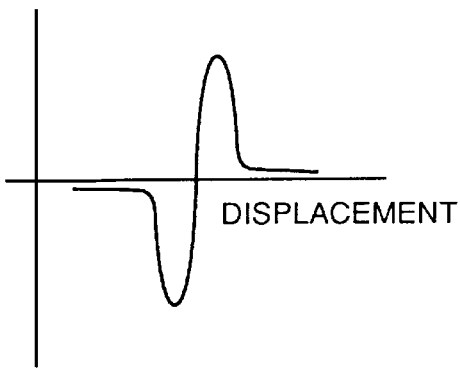
FIGS. 10a to 10d illustrate S-curves of focus error signals of various types of optical disks.
Figure 10B:
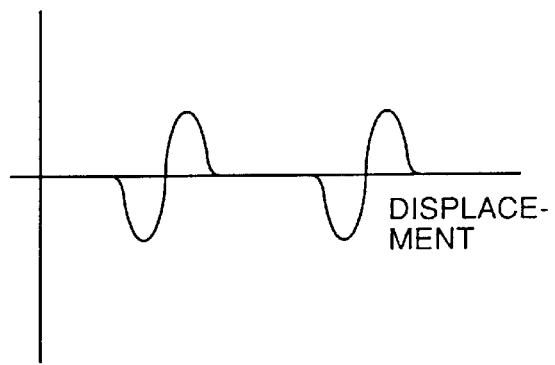
Figure 10C:
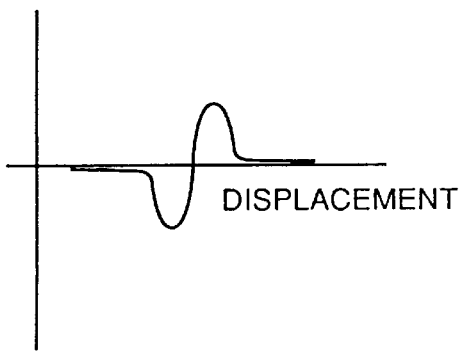
Figure 10D:
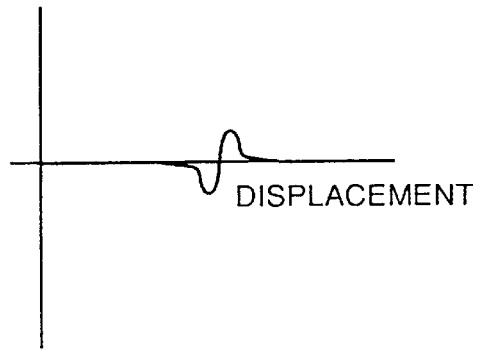
Figure 11A:
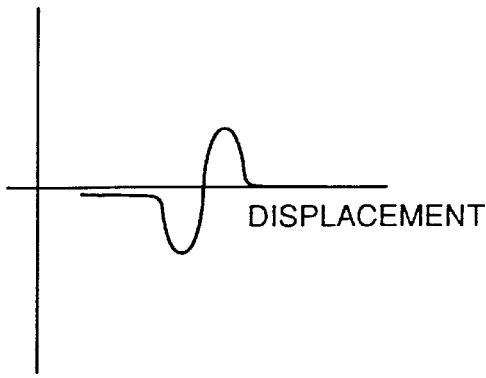
FIGS. 11a to 11d illustrate S-curves of focus error signals of various types of optical disks.
Figure 11B:
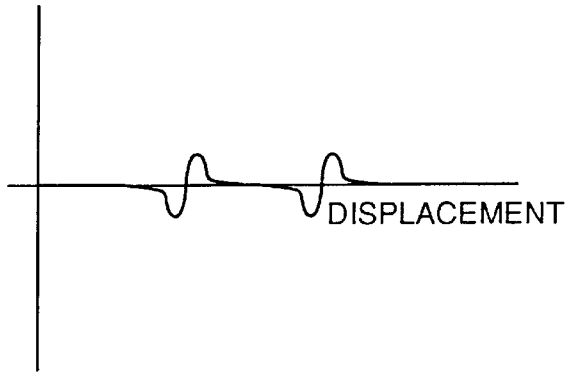
Figure 11C:
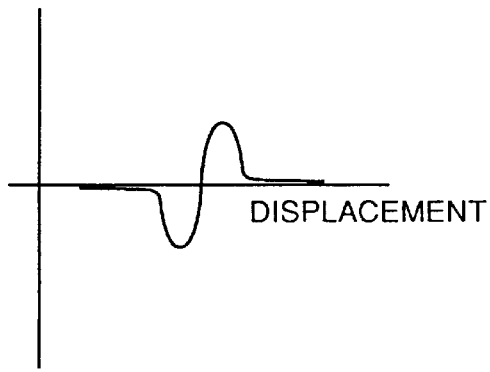
Figure 11D:
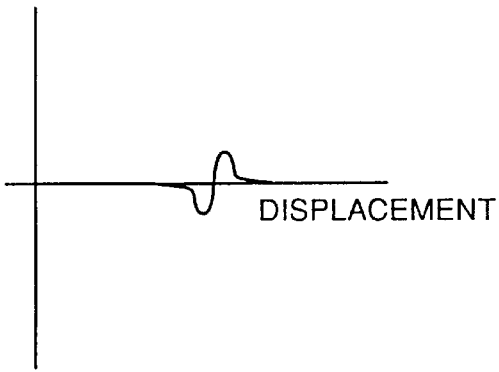

The operation from identification of the optical disk to reproduction of information is described with reference to FIG. 8. The optical disk 1 is irradiated with a laser beam through the pickup 10 at an effective numerical aperture NA of 0.6, so that the S-curve(s) of the focus error signal detected from the optical disk 1 is transmitted to a preamplifier 12, amplified by the preamplifier 12 and thereafter transmitted to a discriminating part 13. The discriminating part 13 detects the peak value(s) of the received S-curve(s) of the focus error signal, and identifies the optical disk due to the level(s) (or the number) of the detected peak value(s).

If the detected S-curve(s) has. a small peak value, for example, the discriminating part 13 determines that the optical disk is an SD2, an HSD2 or a CD. If the detected S-curve has a large peak value, on the other hand, the discriminating part 13 determines that the optical disk is an SD1 or an HSD1. The preamplifier 12 may alternatively be stored in the pickup 10. The signal discriminated in the discriminating part 13 is transmitted to a command part 15, which in turn outputs commands for switching the numerical aperture NA and switching a circuit necessary for reproducing information from the identified optical disk to an NA switching unit 16 and a circuit switching unit 17 respectively. In response to the command from the command part 15, the NA switching unit 16 changes the effective numerical aperture NA of the pickup 10 to be suitable for the identified optical disk. Namely, the NA switching unit 16 sets the numerical aperture NA at 0.30 to 0.55, or 0.20 to 0.30, for reproducing information from an SD1 or an SD2, or a CD with respect to a laser beam having a wavelength of 350 to 450 nm. With respect to a laser beam having a wavelength of 450 to 550 nm, the NA switching unit 16 sets the numerical aperture NA at 0.40 to 0.55, or 0.25 to 0.40, for reproducing information from an SD1 or an SD2, or from a CD. With respect to a laser beam having a wavelength of 585 to 690 nm, the NA switching unit 16 sets the numerical aperture NA at 0.55 to 0.65, or 0.30 to 0.55, for reproducing information from an SD1 or an SD2, or from a CD. With respect to a laser beam having a wavelength of 600 to 700 nm, the NA switching unit 16 sets the numerical aperture NA at 0.55 to 0.65, or 0.30 to 0.55, for reproducing information from an SD1 or an SD2, or from a CD. The circuit switching unit 17 issues a command for circuit switching to an RF demodulation circuit 18, thereby enabling demodulation responsive to the optical disk from which information is to be reproduced. After the numerical aperture NA is set at the value responsive to the identified optical disk, a motor is started if focus servo control receives the OK, so that rotation of the optical disk is started and tracking control is performed. Thereafter the information is reproduced from the optical disk.

While the discriminating part 13 identifies the value of the received S-curve(s) as such, the present invention is not restricted to such an embodiment but a reference value may be previously set in the discriminating part 13 for identifying the optical disk depending on whether or not the peak value exceeds the reference value.

Description is now made on the reproduction of information from the optical disk in the embodiment 1g. The numerical aperture NA is set for each optical disk as follows, for reproducing information from the same. With respect to a laser beam of 350 to 450 nm in wavelength, the numerical aperture NA is set at 0.30 to 0.55 for reproducing information from the SD1 or the SD2, or at 0.55 to 0.65 for reproducing information from the HSD1 or the HSD2. With respect to a laser beam of 450 to 550 nm in wavelength, the numerical aperture NA is set at 0.40 to 0.55 for reproducing information from the SD1 or the SD2, or set at 0.55 to 0.65 for reproducing information from the HSD1 or the HSD2. With respect to a laser beam of 585 to 690 nm in wavelength, the numerical aperture NA is set at 0.55 to 0.65 for reproducing information from the SD1 or the SD2, or from the HSD1 or the HSD2. Also with respect to a laser beam of 600 to 700 nm in wavelength, the numerical aperture NA is set at 0.55 to 0.65 for reproducing information from the SD1 or the SD2, or from the HSD1 or the HSD2.

The operation after setting the numerical aperture NA is identical to the above. In case of reproducing information from the SD2 or the HSD2, however, the detected signal must be amplified, since the recording surface irradiated with the laser beam has a low reflection factor of about 30%.

While the numerical aperture NA must be switched between three types of values in the above description, the present invention is not necessarily restricted to such an embodiment but the numerical aperture NA may be set at 0.30 or 0.60 for reproducing information from the SD1 or the SD2, or from the HSD1 or the HSD2, with respect to a laser beam of 350 to 450 nm in wavelength. Further, the numerical aperture NA may be set at 0.25 or 0.55 for reproducing information from the CD or from the SD1, the SD2, the HSD1 or the HSD2. In other words, information is reproduced from second and third disks at a common numerical aperture NA if information is reproduced from a first optical disk at a single numerical aperture NA, or information is reproduced from the third optical disk at a single numerical aperture NA if information is reproduced from the first and second optical disks at a common numerical aperture NA. This is also applicable to laser beams of other wavelengths.

While the operation from identification of each optical disk to reproduction of information therefrom is described in the above, each optical disk can also be identified in the aforementioned method so that information is recorded therein. When a semiconductor laser unit having power of 30 mW for emitting a laser beam having a wavelength of 650 (600 to 700) nm, 635 (585 to 690) nm, 500 (450 to 550) nm or 400 (350 to 450) nm is employed, it is possible to record information in each of the first, second and third optical disks by employing the optical pickup 10 described in the above items (1a) to (1g) and setting the effective numerical aperture NA of the objective lens 2 of the optical pickup 10 at a value suitable for each optical disk and each wavelength. Each of the second and third optical disks includes that of single-sided recording and that of double-sided recording and single-sided reading.

(C) Reproducing Apparatus

The optical pickup and a recording or reproducing apparatus according to the present invention are described. According to the present invention, optical disks having different substrate thicknesses, different track pitches, different pit depths (physical depths) and different minimum pit lengths are discriminated from each other for thereafter recording or reproducing information in or from the same in response to the respective optical disks. Therefore, the optical pickup employed for the recording or reproducing apparatus requires at least two objective lenses having different effective numerical apertures NA. In this case, the following optical pickups are able to be adapted:

(a) two optical pickups provided with objective lenses having numerical apertures NA responsive to the respective substrate thicknesses;

(b) a single optical pickup provided with two objective lenses having numerical apertures NA responsive to the respective substrate thicknesses; and (c) a single optical pickup provided with a single objective lens having an effective numerical aperture NA changeable in response to the respective substrate thicknesses.

The optical pickup(s) can be selected from the aforementioned three types in the present invention. In each of these three types of optical pickups, the numerical aperture NA is set at 0.55 to 0.65 for identifying each optical disk, at 0.30 to 0.55 or 0.55 to 0.65 (wavelength: 350 to 450 nm), 0.40 to 0.55 or 0.55 to 0.65 (wavelength: 450 to 550 nm) or 0.55 to 0.65 (wavelength: 585 to 690 nm or 600 to 700 nm) with respect to an optical disk having a substrate thickness of 0.55 to 0.65 mm, or set at 0.20 to 0.30 (wavelength: 350 to 450 nm), 0.25 to 0.40 (wavelength: 450 to 550 nm) or 0.30 to 0.55 (wavelength: 585 to 690 nm or 600 to 700 nm) with respect to an optical disk having a substrate thickness of 1.1 to 1.3 mm for recording or reproducing information in or from the same, so that the optical disk can be identified and information can be recorded or reproduced in or from the same. In each of the pickup(s) (a) and (b), the two objective lenses have fixed numerical apertures NA, which are set at 0.55 to 0.65 (for each of the aforementioned wavelengths) and 0.30 (wavelength: 350 to 450 nm), 0.40 (wavelength: 450 to 550 nm) or 0.55 (wavelength: 585 to 690 nm or 600 to 700 nm) respectively.

Thus, it is possible to discriminate the first, second and third optical disks from each other for recording or reproducing information in or from the same by the optical pickup(s) (a) or (b). When the effective numerical aperture NA is switched between three values in the optical pickup (c), on the other hand, it is possible to discriminate the optical disks and record or reproduce information in or from the same in the aforementioned numerical aperture range. In the optical pickup (c), further, the effective numerical aperture NA is not only switched between three values but can be freely set in the range of 0.25 to 0.65.

The wavelength of the laser beam can be selected from the range of 350 to 700 nm, and is preferably at 650 (600 to 700) nm, 635 (585 to 690) nm, 500 (450 to 550) nm or 400 (350 to 450) nm, and more preferably at 415 to 445 nm, 517 nm, 620 to 650 nm, or 635 to 665 nm.

When each optical disk is identified with one of the aforementioned three types of pickups, the S-curve of the focus error signal can be employed in any optical pickup(s).

(2) Second Embodiment

In each of the aforementioned embodiments 1a to 1h, the focus error signal is detected in focusing with the objective lens at a numerical aperture NA of 0.6, i.e., a numerical aperture NA capable of focusing the laser beam on the recording surface of each optical disk having a substrate thickness of 0.6 mm, for identifying the optical disk. However, the present invention is not restricted to this but a focus error signal can be detected in focusing with an objective lens having a numerical aperture NA of 0.35, i.e., a numerical aperture NA which can focus a laser beam on a recording surface of an optical disk having a substrate thickness of 1.2 mm for identifying the optical disk.

FIGS. 11a to 11d illustrate focus error signals of an SD1 or an HSD1, an SD2 or an HSD2, a CD, and a CD-R respectively in case of employing an objective lens having a numerical aperture NA of 0.35 for a substrate thickness of 1.2 mm. The SD1 and the HSD1 exhibit the same strength of focus error signal due to the same substrate thicknesses of 0.6 mm and the same reflectivity of 70%. While the SD2 and the HSD2 exhibit the same strength of focus error signal due to the same substrate thicknesses of 0.6 mm and the same reflectivity of 20 to 40%, the strength is not more than half that of the SD1 or the HSD1. The strength of focus error signal of the CD is identical to that of the SD1 and the HSD1. The strength of focus error signal of the CD-R is not more than about half that of the CD, and substantially identical to that of the SD2 or the HSD2. Therefore, the CD-R, the SD1 or the HSD1 and the CD can be discriminated from each other through the strength of focus error signal values. On the other hand, the CD-R and the SD2 or the HSD2 can be discriminated from each other not through the strength of focus error signal values but through the numbers of peaks of the focus error signals. Namely, peaks of the focus error signal appear twice in the SD2 or the HSD2, while a peak appears once in case of the CD-R, and hence the SD2 or the SD2 and the CD-R can be discriminated from each other by detecting the numbers of the peaks of the focus error signals.

Further, the CD, the SD1 or the HSD1, and the SD2 or the HSD2 can be discriminated from each other by detecting the strength of focus error signal values or the peak numbers.

Also according to the second embodiment, each optical disk can be identified with a laser beam of 635 (585 to 690) nm or 650 (600 to 700) nm in wavelength, and a pickup can be selected from the three types of pickups described with reference to the first embodiment, i.e., (a) two optical pickups provided with objective lenses having numerical apertures NA responsive to the respective substrate thicknesses;

(b) a single optical pickup provided with two objective lenses having numerical apertures NA responsive to the respective substrate thicknesses; and (c) a single optical pickup provided with a single objective lens having an effective numerical aperture NA variable with the respective substrate thicknesses.

The beam is not restricted to a circular shape but may have an elliptical shape, or any of the polygonal shapes shown in FIGS. 9a to 9g.

(3) Third Embodiment

According to this embodiment, optical disks having rated values and reproducing conditions shown in FIGS. 12 to 15 are discriminated from each other so that information is reproduced from the same. The method of discrimination is the same as those in the first and the second embodiments. FIG. 12 shows other examples of minimum pit lengths and track pitches of and beam spot diameters for first, second and third optical disks and numerical apertures NA of optical lenses in case of employing a laser beam having a wavelength of 350 to 450 nm (typical wavelength: 415 to 445 nm, identical for the rest). FIG. 13 shows other examples of minimum pit lengths and track pitches of and beam spot diameters for the first, second and third optical disks and numerical apertures NA of the optical lenses in case of employing a laser beam having a wavelength of 450 to 550 nm (typical wavelength: 517 to 547 nm, identical for the rest). Further, FIGS. 14 and 15 show other examples of minimum pit lengths and track pitches of and beam spot diameters for the first, second and third optical disks and numerical apertures NA of the optical lenses in case of employing laser beams having wavelengths of 585 to 690 nm (typical wavelength: 620 to 650 nm, identical for the rest) and 600 to 700 nm (typical wavelength: 635 to 665 nm, identical for the rest) respectively. Each of the second and third optical disks includes that of single-sided recording and that of double-sided recording and single-sided reading. Pit depths (physical depths) of the first, second and third optical disks are 110 (90 to 130) nm, 105 (95 to 115) nm and 72 (62 to 82) nm respectively, similarly to the above description with reference to FIGS. 1 to 4.

(4) Fourth Embodiment (A) Discriminating Method

A fourth embodiment of the present invention is now described. An apparatus structure in the fourth embodiment is similar to those in the first to third embodiments, with an objective lens having a variable effective numerical aperture NA.

According to the fourth embodiment, the objective lens of an optical pickup is reciprocated twice (vertically moved twice), for detecting and determining two focus error signals detected during the reciprocation. Namely, the optical pickup is provided with an objective lens having a numerical aperture NA of 0.6 (allowance: ±0.05, identical for the rest) which can focus a beam on a signal recording surface of an optical disk having a substrate thickness of 0.6 mm for detecting a first focus error signal in a first reciprocation while setting the numerical aperture NA of the objective lens at 0.6. Then, the effective numerical aperture NA of the objective lens is set at 0.35 (allowance: ±0.05, identical for the rest) for performing a second reciprocation, and detecting a second focus error signal. The optical disk is identified due to presence/absence of change in waveforms of the detected first and second focus error signals.

Figure 16:
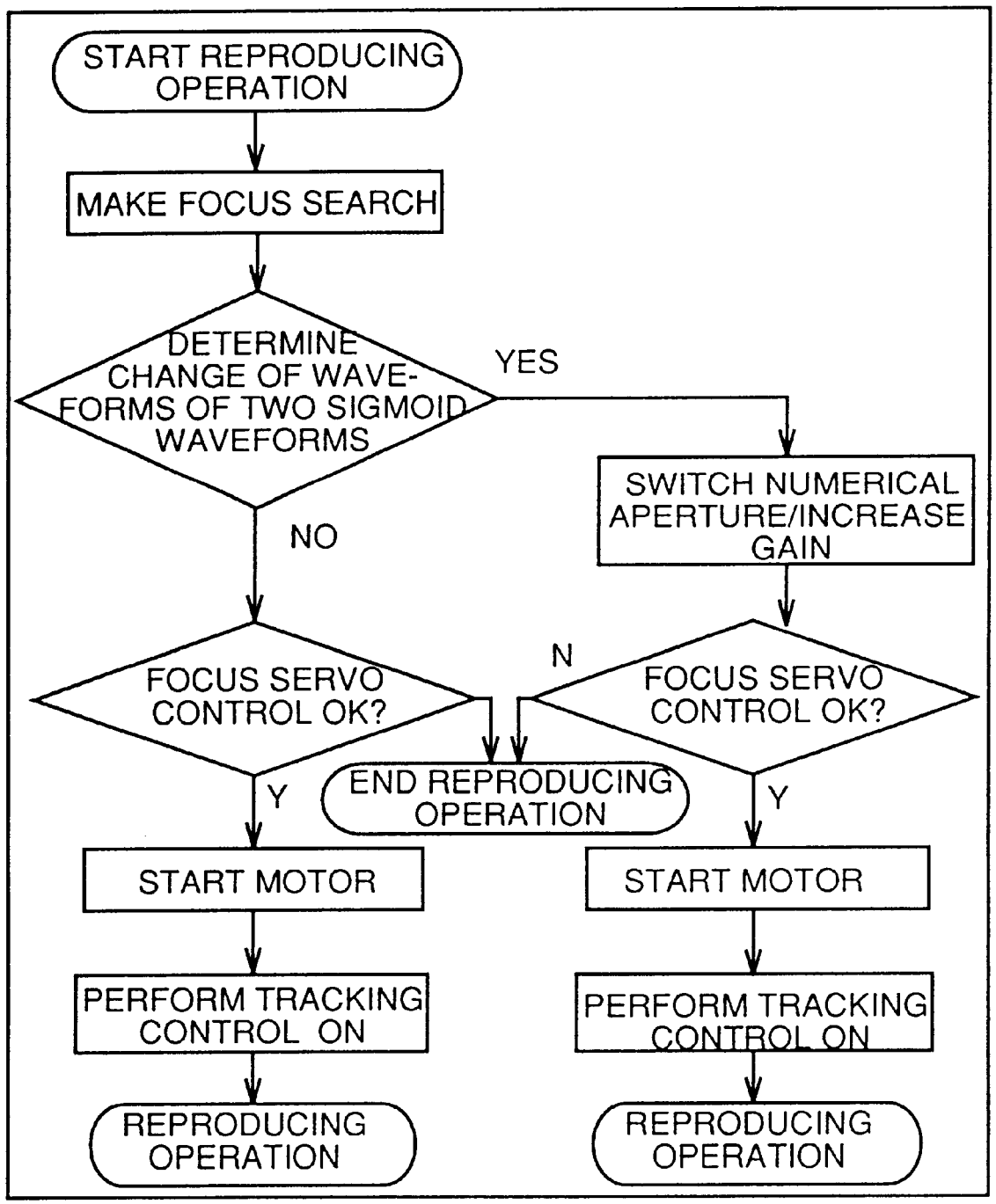
FIG. 16 is a flow chart showing an operation of reproducing information from an optical disk in a fourth embodiment of the present invention.

FIG. 16 is a flow chart showing a process from a reproducing operation start up to a reproducing operation in the fourth embodiment. The fourth embodiment is adapted to identify each mounted optical disk due to presence/absence of change in focus error signal waveforms during two vertical reciprocations of the objective lens of the optical pickup, for reproducing or recording information from or in the identified optical disk. While a motor is started after focus servo control receives the OK in FIG. 16, the present invention is not restricted to such an embodiment but a focus search may be alternatively be performed after the motor is started.

(4a) Discrimination of CD and SD1 or SD2

Discrimination between a CD and an SD1 or an SD2 is now described.

Figure 17A:
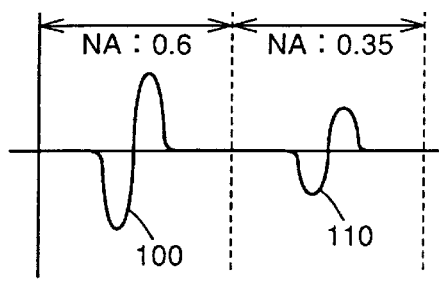
FIGS. 17a to 17c illustrate S-curve waveforms of focus error signals of various types of optical disks.
Figure 17B:
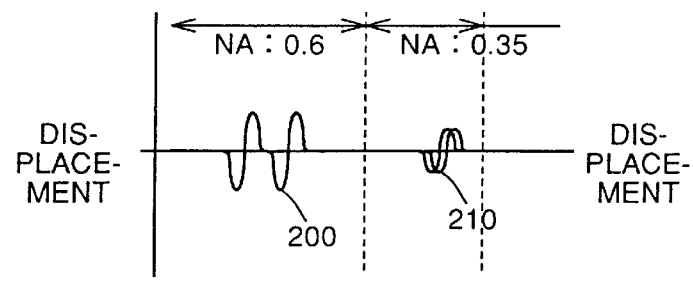
Figure 17C:
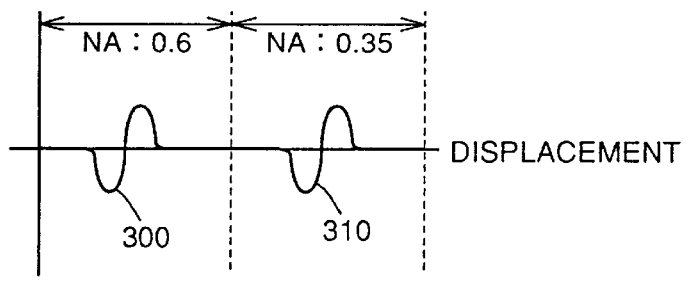

FIGS. 17a to 17c illustrate focus error signals detected in relation to an SD1, an SD2 and a CD with an objective lens for a substrate thickness of 0.6 mm in double reciprocations respectively. When a focus search is started after each optical disk is mounted, the objective lens of the optical pickup performs a first reciprocation while setting the effective numerical aperture NA at 0.6, and then performs a second reciprocation while setting the effective numerical aperture NA at 0.35. In case of the SD1, therefore, first and second focus error signals 100 and 110 obtained in the first and second reciprocations consist of S-curves as shown in FIG. 17a, while the waveform of the second focus error signal 110 is substantially halved as compared with that of the first focus error signal 110 in the signal strength direction. In the SD1 having a substrate thickness of 0.6 mm, an outer side of a laser beam is shaded when the effective numerical aperture NA of the objective lens 2 is 0.35, and hence the quantity of reflected light is reduced as compared with the CD and the signal strength of the second focus error signal 110 is substantially halved as compared with the first focus error signal 100. In case of the SD2, on the other hand, a first focus error signal 200 is about half the first focus error signal 100 of the SD1 in strength as shown in FIG. 17b, while two S-curves are observed. This is because a first recording surface of the SD2 irradiated with the laser beam has a lower reflection factor of about 30% as compared with that of at least 70% of the recording surface of the SD1, and the SD2 has two layers of signal recording surfaces. A second focus error signal 210 of the SD2 is about half the first focus error signal 200 in strength. The reason for this is identical to that in the case of the SD1. In the case of the CD, a first focus error signal 300 is substantially halved as compared with the first focus error signal 100 of the SD1 in strength as shown in FIG. 17c, while each of the first focus error signal 300 and a second focus error signal 310 consists of a single S-curve. The signal strength of the CD is about half that of the first focus error signal 100 of the SD1 since the CD has a substrate thickness of 1.2 mm, which is about twice the substrate thickness (0.6 mm) of the SD1 and hence the laser beam is focused on a portion before the signal recording surface of the CD when the effective numerical aperture NA of the objective lens is 0.6 and the light intensity is reduced on the signal recording surface of the CD. The second focus error signal 310 of the CD is identical to the first focus error signal 300.

Therefore, the CD can be identified if there is no change in the first and second focus error signals consisting of S-curves detected by a photodetector in a focus search, while the SD1 or the SD2 can be identified if the first and second focus error signals have different waveforms. Thus, it is possible to discriminate the CD and the SD1, as well as the CD and the SD2 from each other. While the effective numerical aperture NA is set at 0.6 and 0.35 in the first and second reciprocations of the objective lens respectively in this embodiment 4a, these values may alternatively be reversed. In this case, the waveforms of the first and second focus error signals in the SD1 and the SD2 are simply reversed.

Each of FIGS. 17a to 17c illustrates signals obtained only single (approaching or separating) one of vertical movements of the objective lens in the focus search.

The numerical aperture NA of the objective lens is changed in every reciprocation in the above described embodiment. However, it is possible to obtain the same data by changing the numerical aperture NA every half of the reciprocation (only single ones of vertical movements of the objective lens).

(4b) Discrimination of CD and HSD1 or HSD2

Discrimination between first and third optical disks, i.e., the CD and the HSD1 or the HSD2, is now described.

Figure 18A:
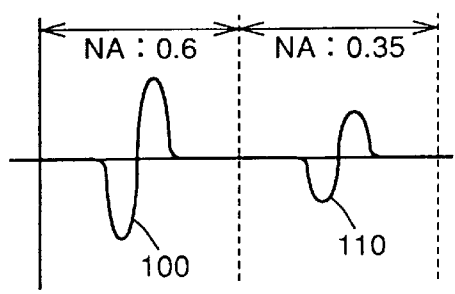
FIGS. 18a to 18c illustrate S-curve waveforms of focus error signals of various types of optical disks.
Figure 18B:
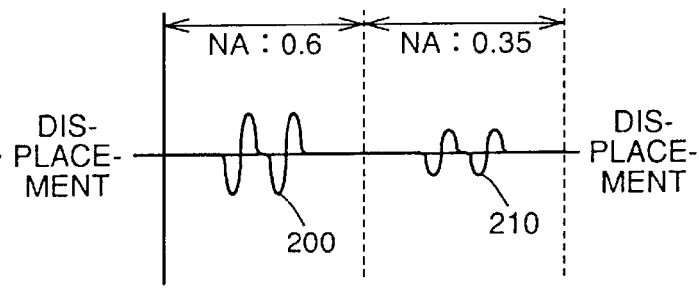
Figure 18C:
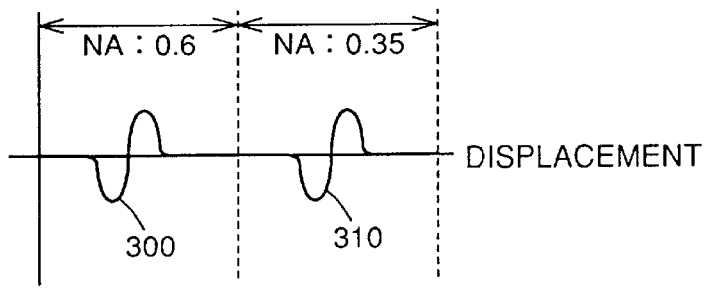

FIGS. 18a to 18c illustrate focus error signals in relation to the HSD1, the HSD2 and the CD in double reciprocations respectively. Also in this embodiment 4b, the effective numerical aperture NA of the objective lens is set at 0.6 for the first reciprocation and at 0.35 for the second reciprocation. The reflectivity, the substrate thicknesses and the numbers of the signal recording surfaces of the HSD1 and the HSD2 are identical to those of the SD1 and the SD2 respectively; and hence, first and second focus error signals obtained in the HSD1, the HSD2 and the CD are identical to the first and second focus error signals 100, 110, 200, 210, 300 and 310 obtained in the SD1, the SD2 and the CD in the above embodiment 4a, respectively.

In this embodiment 4b, therefore, the CD and the HSD1, as well as the CD and the HSD2 can be discriminated from each other. Also in the embodiment 4b, the values of the effective numerical aperture NA of the objective lens in the first and second reciprocations may be reversed.

(4c) Discrimination of SD1 and HSD2 or HSD1 and SD2

Discrimination of the second and third disks, i.e., the SD1 and the HSD2 or the HSD1 and the SD2 is now described.

Figure 19A:
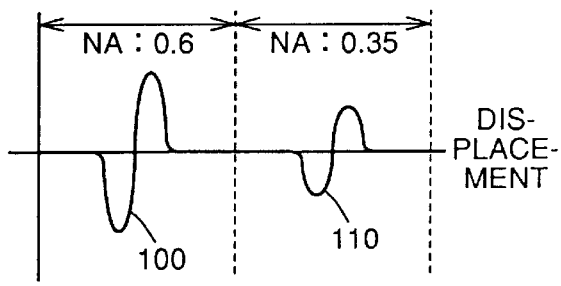
FIGS. 19a and 19b illustrate S-curve waveforms of focus error signals of various types of optical disks.
Figure 19B:
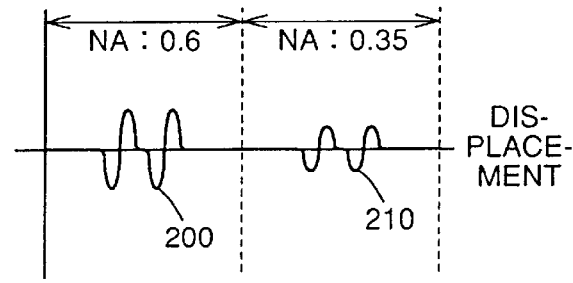

FIGS. 19a and 19b illustrate focus error signals in relation to the SD1 and the HSD2 in double reciprocations respectively. The first and second focus error signals in the SD1 and the HSD2 are identical to the first and second focus error signals 100, 110, 200 and 210 respectively. Therefore, the SD1 is identified if each of the first and second focus error signals consists of a single S-curve, while the HSD2 is identified if each of the first and second focus error signals consists of two S-curves. In this case, the objective lens may be reciprocated not twice but once, since the focus error signals obtained in single reciprocations of the objective lens have different waveforms.

Figure 20A:
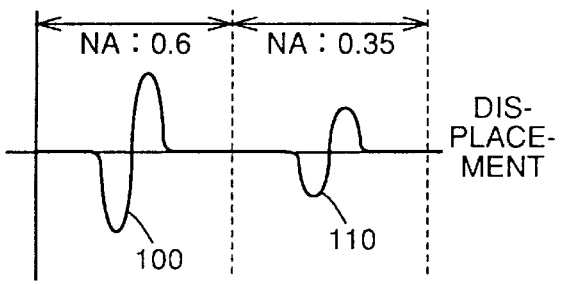
FIGS. 20a and 20b illustrate S-curve waveforms of focus error signals of various types of optical disks.
Figure 20B:
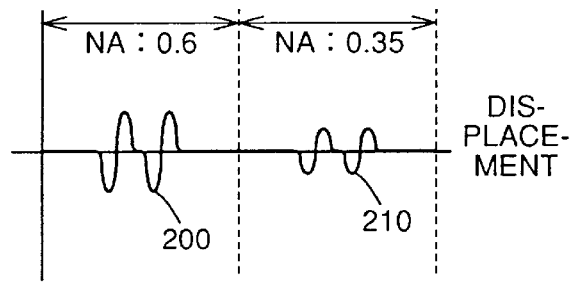

FIGS. 20a and 20b illustrate focus error signals in relation to the HSD1 and the SD2 in double reciprocation respectively. The first and second focus error signals in the HSDL and the SD2 are also identical to the first and second focus error signals 100, 110, 200 and 210 respectively. Therefore, the HSD1 is identified if each of the first and second focus error signals consists of a single S-curve, while the SD2 is identified if each of the first and second focus error signals consists of two S-curves. Also in this case, the objective lens may be reciprocated not twice but once, since the focus error signals obtained in single reciprocations of the objective lens have different waveforms.

Also in this embodiment 4c, the values of the effective numerical aperture NA of the objective lens in the first and second reciprocations may be reversed if the objective lens is reciprocated twice.

(4d) In case of Employing Single Optical Pickup Provided with Two Objective Lenses having Different Effective Numerical Apertures Each of the embodiments 4a to 4c has been described with reference to the case of identifying each optical disk with a single optical pickup provided with a single objective lens. In relation to this embodiment 4d, identification of an optical disk with a signal optical pickup provided with two objective lenses having different effective numerical apertures NA is described.

FIG. 21 shows an optical pickup 30 which is employed in this embodiment. This optical pickup 30 has a semiconductor laser unit 9, a diffraction grating 8, a collimator lens 7, a polarizing beam splitter 4, a quarter-wave plate 20, a condenser lens group 5 and a photodetector 6, similarly to the optical pickup 10 employed in the first embodiment. The optical pickup 30 is provided with objective lenses 2a and 2b having effective numerical apertures NA of 0.6 and 0.35 respectively, which can focus a laser beam on a signal recording surface of an optical recording medium having a substrate thickness of 0.6 mm. In a first reciprocation in a focus search after mounting of each optical disk, therefore, the objective lens 2a having the effective numerical aperture NA of 0.6 is set for detecting a first focus error signal. Then, the lens 2a is switched to the objective lens 2b having the numerical aperture NA of 0.35 before the operation advances to a second reciprocation, for detecting a second focus error signal. The objective lens 2a and 2b employed for the first and second times may alternatively be reversed.

The first and second focus error signals obtained in a CD, an SD1, an SD2, an HSD1 and an HSD2 are similar to those described with reference to the embodiments 4a to 4c, and hence these optical disks are discriminated from each other similarly to the embodiments 4a, 4b and 4c.

(4e) Discrimination of Optical Disks in case of Employing Two Optical Pickups

Figure 22:
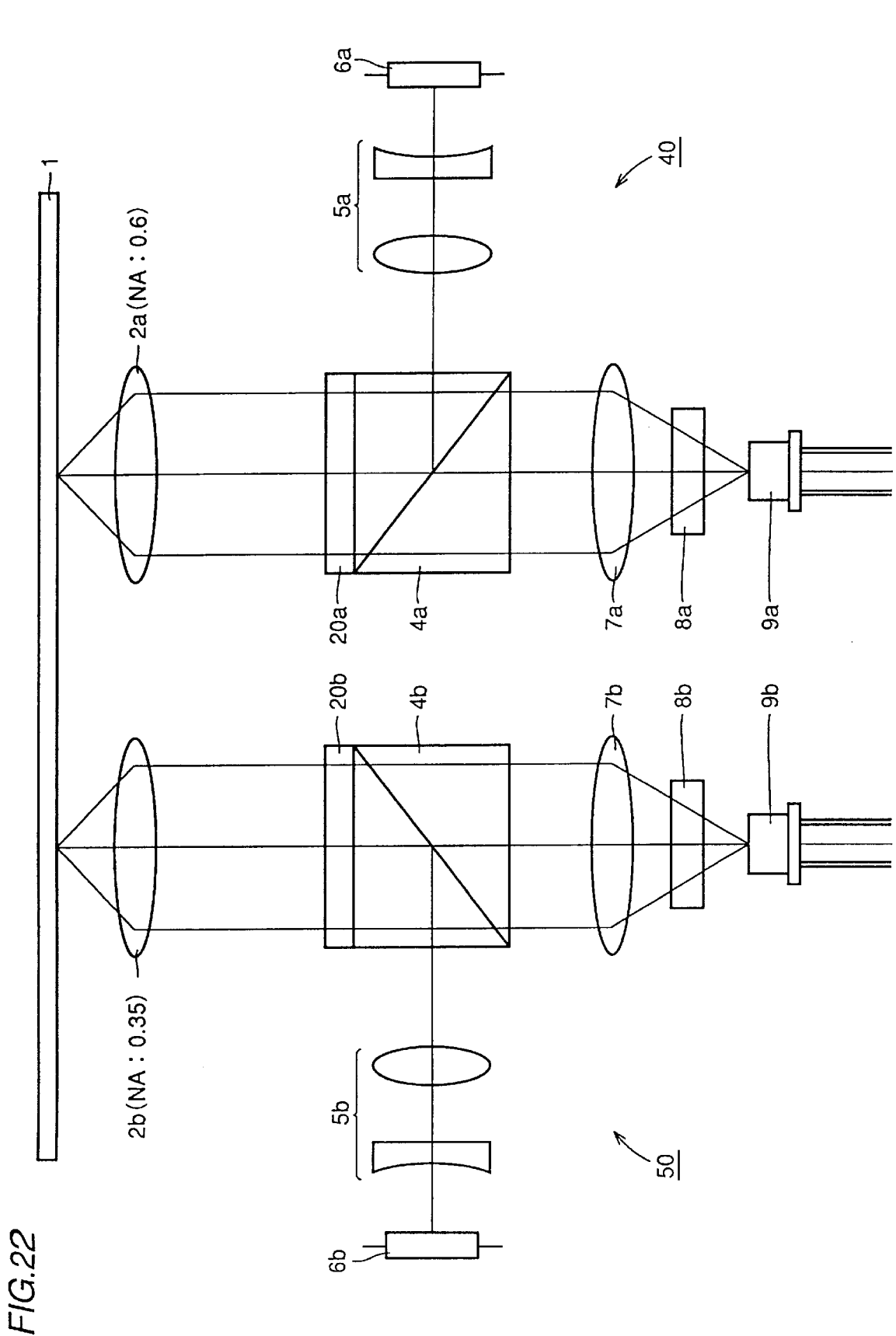
FIG. 22 is a model diagram showing two pickups capable of compatible reproduction which are employed in an embodiment 4e.

FIG. 22 shows two optical pickups 40 and 50 employed in this embodiment 4e. The optical pickups 40 and 50 are provided with objective lenses 2a and 2b having effective numerical apertures NA of 0.6 and 0.35 respectively, which can focus a laser beam on a signal recording surface of an optical recording medium having a substrate thickness of 0.6 mm. These two pickups 40 and 50 have the same structures, and hence corresponding portions thereof are denoted by the same reference numerals, with suffixes "a" and "b" for the optical pickups 40 and 50 respectively.

In this embodiment 4e, the process enters a focus search operation when each optical disk is mounted, so that the objective lenses 2a and 2b of the two optical pickups 40 and 50 simultaneously start first reciprocations for detecting focus error signals respectively. According to this embodiment, therefore, the focus error signals obtained from the optical pickups 40 and 50 are regarded as first and second focus error signals respectively. Thus, each of the objective lenses 2a and 2b may be simply reciprocated only once in this embodiment.

Figure 23A:
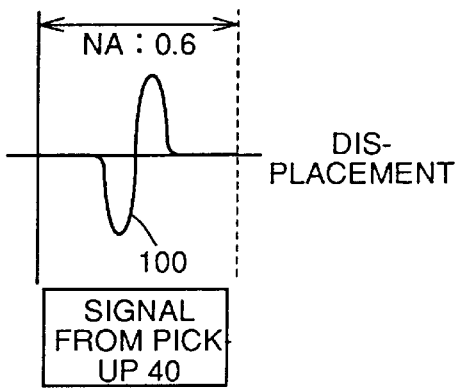
FIGS. 23a to 23c illustrate S-curve waveforms of focus error signals of various types of optical disks.
Figure 23B:
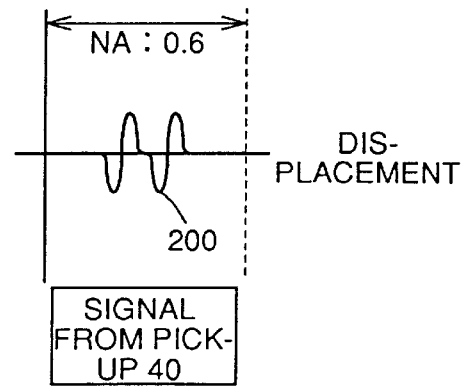
Figure 23C:
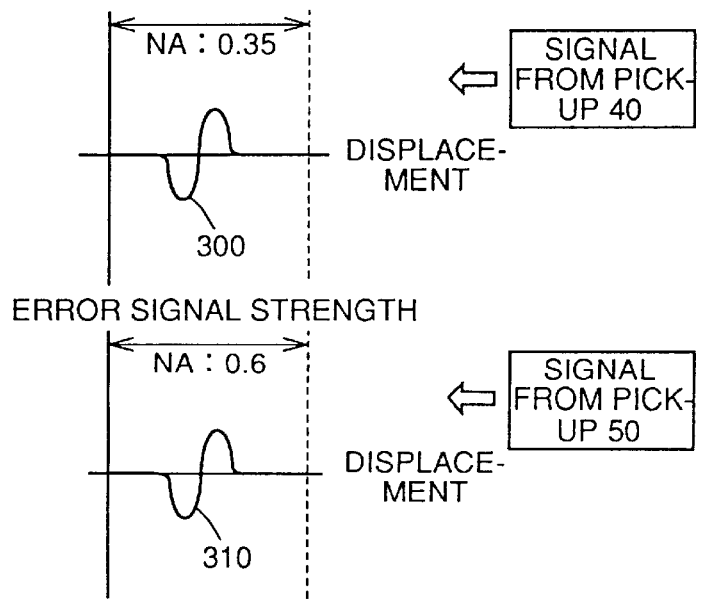

FIGS. 23a to 23c illustrate first and second focus error signals of the SD1, the SD2 and the CD respectively. The first and second focus error signals obtained from these optical disks are identical to the first and second focus error signals 100, 110, 200, 210, 300 and 310 in the aforementioned embodiment 4a respectively, and hence the CD and the SD1 as well as the CD and the SD2 can be discriminated from each other through presence/absence of change in the waveforms of the first and second focus error signals in the respective optical disks similarly to the embodiment 4a.

FIGS. 24a to 24c illustrate first and second focus error signals of the HSD1, the HSD2 and the CD respectively. The first and second focus error signals obtained from these optical disks are also identical to the first and second focus error signals 100, 110, 200, 210, 300 and 310 in the embodiment 4b respectively, and hence the CD and the HSD1 as well as the CD and the HSD2 can be discriminated from each other through presence/absence of change in the waveforms of the first and second focus error signals in the respective optical disks, similarly to the embodimen 4b.

FIGS. 25a and 25b illustrate first and second focus error signals of the HSD1 and the SD2, respectively. The first and second focus error signals obtained from these optical disks are identical to the first and second focus error signals 100, 110, 200 and 210 in the aforementioned embodiment 4c respectively; and hence, the HSD1 and the SD2 can be discriminated from each other through presence/absence of change in the waveforms of the first and second focus error signals in the respective optical disks, similarly to the embodiment 4c.

FIGS. 26a and 26b illustrate first and second focus error signals of the SD1 and the HSD2 respectively. The first and second focus error signals obtained from these optical disks are identical to the first and second focus error signals 100, 110, 200 and 210 in the aforementioned embodiment 4c respectively; and hence, the SD1 and the HSD2 can be discriminated from each other through presence/absence of change in the waveforms of the first and second focus error signals in the respective optical disks, similarly to the embodiment 4c.

In the fourth embodiment of the present invention, optical pickups 40 and 50 may not be simultaneously reciprocated but a reciprocation of the second pickup may be started after that of the first optical pickup is completed.

In each of the aforementioned embodiments 4a to 4e, each optical disk can be identified with a laser beam having a wavelength of 350 to 700 nm, preferably 350 to 450 nm, 450 to 550 nm, 585 to 690 nm or 600 to 700 nm, and more preferably 415 to 445 nm, 517 to 547 nm, 620 to 650 nm or 635 to 665 nm.

While the values of the effective numerical aperture NA which can focus the laser beam on the signal recording surface of each optical recording medium having a substrate thickness of 0.6 mm are indicated as 0.6 and 0.35 respectively, the present invention is not restricted to such an embodiment but the numerical aperture NA may be set in the range of 0.2 to 0.45.

Further, the beam is not restricted to a circular shape, but may have an elliptical shape, or any of the polygonal shapes shown in FIGS. 9a to 9g.

(B) Discriminating Apparatus

FIG. 27 is a block diagram showing an apparatus for identifying an optical disk and reproducing information from the same in the fourth embodiment. First and second focus error signals obtained from an optical pickup 111 by any method of the embodiments 4a to 4e are transmitted to a preamplifier 112, to be I–V converted and transmitted to a discriminating part 113. The discriminating part 113 detects the waveforms of the received first and second focus error signals, and identifies the optical disk by presence/absence of change in the detected waveforms. For example, the discriminating part 113 identifies the optical disk as the SD1 or the HSD1, as the SD2 or the HSD2, or as the CD if the detected first and second focus error signals are the first and second error signals 100 and 110, 200 and 210, or 300 and 310. The signals identified by the discriminating part 13 are transmitted to a command part 115, which in turn, outputs commands for switching the effective numerical aperture to a value necessary for reproducing information from the identified optical disk and for switching a circuit to an NA switching unit 116 and a circuit switching unit 17 respectively. The NA switching unit 116 switches the effective numerical aperture NA of an objective lens provided in the optical pickup 111 to be suitable for reproducing information from the identified optical disk. Namely, the effective numerical aperture NA is set at 0.30 to 0.55 or 0.20 to 0.30 for reproducing information from the SD1 or the SD2, or from the CD with respect to a laser beam having a wavelength of 350 to 450 nm. With respect to a laser beam having a wavelength of 450 to 550 nm, on the other hand, the effective numerical aperture NA is set at 0.40 to 0.55 or 0.25 to 0.40 for reproducing information from the SD1 or the SD2, or from the CD. With respect to a laser beam having a wavelength of 585 to 690 nm, the effective numerical aperture NA is set at 0.55 to 0.65 or 0.30 to 0.55 for reproducing information from the SD1 or the SD2, or from the CD. With respect to a laser beam having a wavelength of 600 to 700 nm, on the other hand, the effective numerical aperture NA is set at 0.55 to 0.65 or 0.30 to 0.55 for reproducing information from the SD1 or the SD2, or from the CD. The circuit switching unit 117 issues a command for circuit switching to an RF demodulation circuit 118, thereby enabling demodulation responsive to the optical disk from which information is to be reproduced. After the effective numerical aperture NA is set at the value responsive to the identified optical disk, a motor is started if focus servo control receives the OK, so that rotation of the optical disk is started and tracking control is performed. Thereafter the information is reproduced from the optical disk. The preamplifier 112 may be stored in the pickup 111.

An operation of discriminating the SD1 and the HSD1 or the SD2 and the HSD2 from each other and reproducing information from each optical disk is now described. In this case, S-curves detected by a photodetector of the optical pickup 111 have the same peak values, and hence each optical disk is identified by the number of detected peak values. The SD1 or the HSD1 is identified if each S-curve has a single peak value, while the SD2 or the HSD2 is identified if each S-curve has two peak values. In this case, the numerical aperture NA is set for each optical disk as follows, for reproducing information: With respect to a laser beam of 350 to 450 nm in wavelength, the numerical aperture NA is set at 0.30 to 0.55 for reproducing information from the SD1 or the SD2, or set at 0.55 to 0.65 for reproducing information from the HSD1 or the HSD2. With respect to a laser beam of 450 to 550 nm in wavelength, the numerical aperture NA is set at 0.40 to 0.55 for reproducing information from the SD1 or the SD2, or set at 0.55 to 0.65 for reproducing information from the HSD1 or the HSD2. With respect to a laser beam of 585 to 690 nm in wavelength, the numerical aperture NA is set at 0.55 to 0.65 for reproducing information from the SD1 or the SD2, or from the HSD1 or the HSD2. Also with respect to a laser beam of 600 to 700 nm in wavelength, the numerical aperture NA is set at 0.55 to 0.65 for reproducing information from the SD1 or the SD2, or from the HSD1 or the HSD2.

The operation after setting the numerical aperture NA is identical to the above. In case of reproducing information from the SD2 or the HSD2, however, the detected signals must be amplified, since the recording surface irradiated with the laser beam has a low reflection factor of about 30%.

While the numerical aperture NA must be switched between three types of values in the aforementioned embodiment, the present invention is not restricted to this but the numerical aperture NA may be set at 0.30 or 0.60 for reproducing information from the CD and the SD1 or the SD2, or from the HSD1 or the HSD2 with respect to the laser beam having a wavelength of 350 to 450 nm. Alternatively, the numerical aperture NA may be set at 0.25 or 0.55 for reproducing information from the CD, or from the SD1, SD2, HSD1 or the HSD2. In other words, information is reproduced from second and third disks at a common numerical aperture NA if information is reproduced from a first optical disk at a single numerical aperture NA, or information is reproduced from the third optical disk at a single numerical aperture NA if information is reproduced from the first and second optical disks at a common numerical aperture NA. This is also applicable to laser beams of other wavelengths.

While the operation from identification of each optical disk to reproduction of information therefrom is described in the above, each optical disk can also be identified in the aforementioned method so that information is recorded therein. When a semiconductor laser unit having power of 30 mW for emitting a laser beam having a wavelength of 600 to 700 nm, 585 to 690 nm, 450 to 550 nm or 350 to 450 nm is employed, it is possible to record information in each of first, second and third optical disks by employing the optical pickup described above and setting the effective numerical aperture NA of the objective lens of the optical pickup at a value suitable for each optical disk and each wavelength.

(5) Fifth Embodiment (A) Discriminating Method

According to a fifth embodiment of the present invention, each optical disk is identified by determining a tracking signal level.

Figure 28:
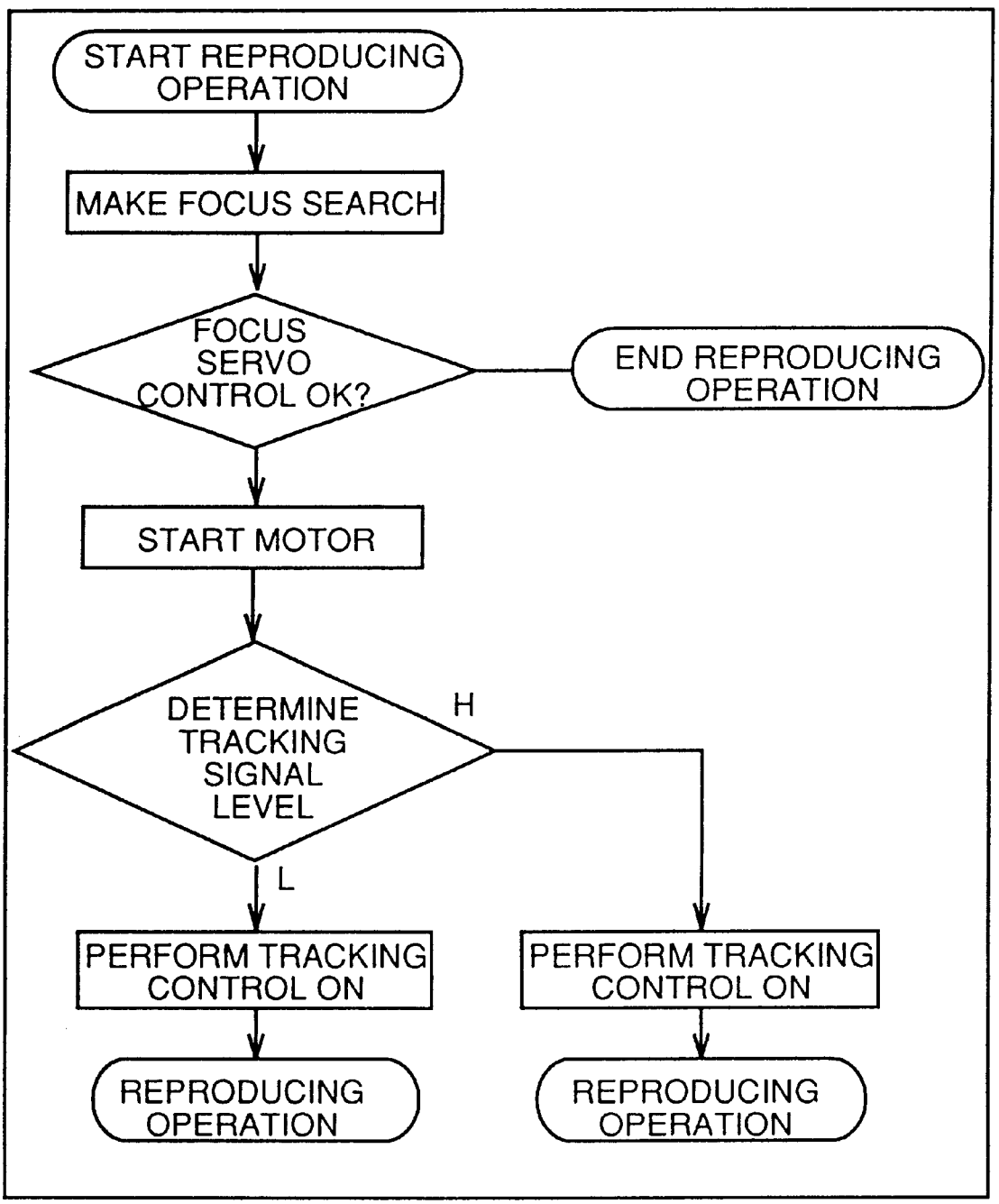
FIG. 28 is a flow chart showing an operation for reproducing information from an optical disk in a fifth embodiment of the present invention.

FIG. 28 is a flow chart showing a process from a reproducing operation start up to a reproducing operation in the fifth embodiment. The operation for reproducing information from an optical disk with an optical pickup is performed in the following manner: When the optical disk is mounted, the reproducing operation is started for performing a focus search and focus servo control. If the focus servo control receives no OK, the reproducing operation is ended. If the focus servo control receives the OK, on the other hand, a motor is started to perform tracking control, for starting an ordinary reproducing operation. The fifth embodiment is adapted to detect the level of a tracking signal which depends on the mounted optical disk for identifying the optical disk in tracking control, and reproducing information from the identified optical disk. In this discriminating function, a reference value for the tracking signal level is previously set for determining whether the level of the detected tracking signal is higher or lower than the reference value and reproducing information from an SD which is a DVD (abbreviation of the standardized super high density disk such as the SD1 and the SD2) if the level is low, or reproducing information from a CD if the level is high. In case of identifying the optical disk through an RF signal level, a function of identifying the optical disk through the RF signal is added before the tracking control.

Therefore, a reproducing apparatus employed for reproducing each optical disk in this embodiment may have a function of reproducing information from a plurality of target optical disks similarly to the apparatus shown in FIG. 6 described with reference to the first embodiment; and hence, redundant description is omitted.

(a) Discrimination of CD and SD1

Figure 29:
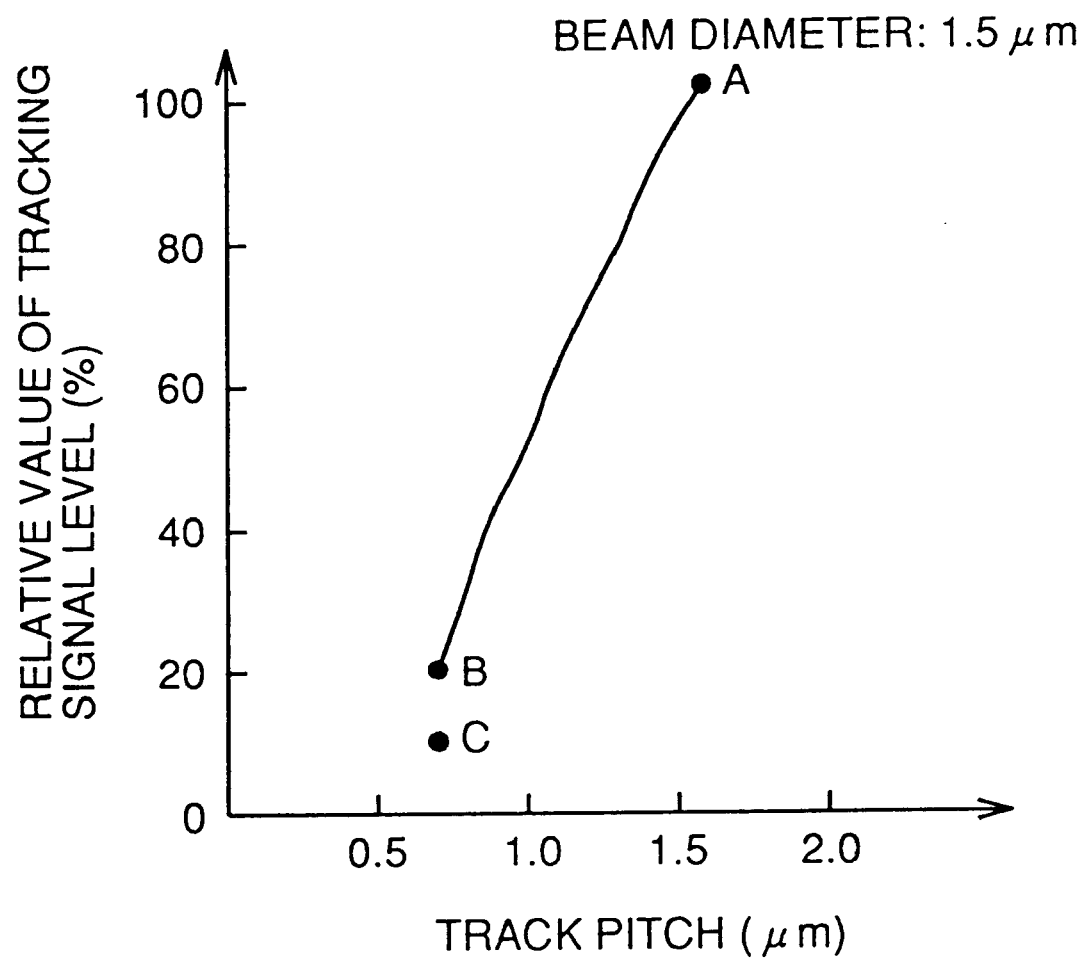
FIG. 29 illustrates the relation between tracking signal levels and track pitches of optical disks in the fifth embodiment.
Figure 30A:
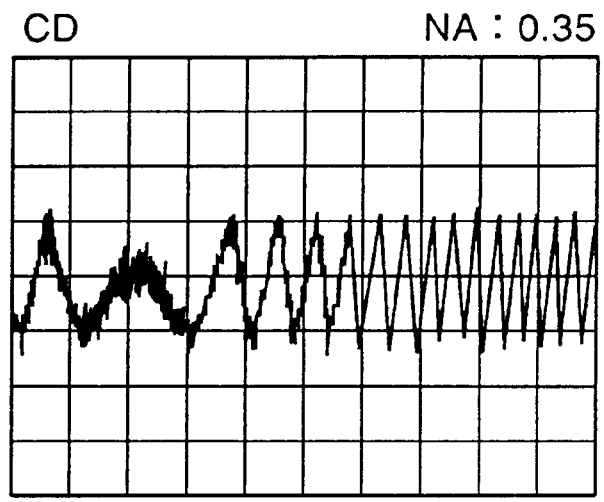
FIGS. 30a and 30b illustrate tracking signal waveforms of a CD and an SD respectively.
Figure 30B:
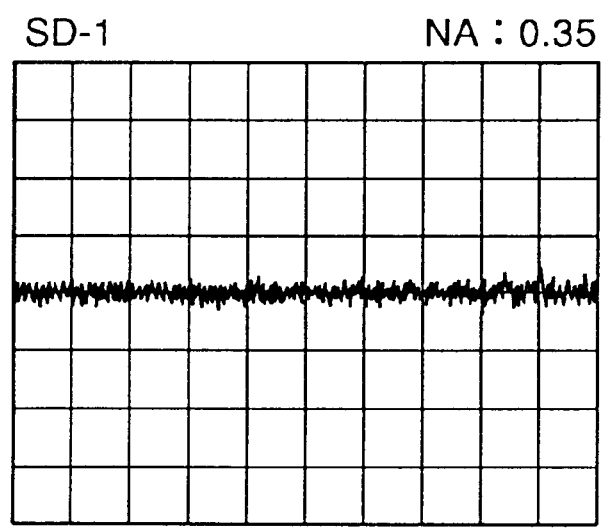

In this case, both optical disks have the same reflectivity of at least 70% on recording surfaces, while having extremely different track pitches of 1.6 $\mu$m and 0.74 $\mu$m. FIG. 29 illustrates the relation between relative values of tracking signal levels and track pitches in case of a beam diameter of 1.5 $\mu$m, a recording surface reflection factor of at least 70%, and an effective numerical aperture NA of 0.35. This figure shows the tracking signal levels of the respective track pitches on the assumption that the tracking signal level at the CD track pitch of 1.6 (allowance: ±0.1) $\mu$m is 100%. When the track pitch is changed from the CD track pitch of 1.6 $\mu$m to the SD1 track pitch of 0.74 (allowance: ±0.03) $\mu$m, the tracking signal level is reduced below 20%. Therefore, each optical disk can be identified by determining the tracking signal level. FIGS. 30a and 30b illustrate results of tracking signal waveforms measured in practice in a CD and an SD1 with an effective numerical aperture NA of 0.35, recording surface reflectivity of at least 70% and a beam diameter of about 1.5 $\mu$m respectively. It has been recognized that the peak-to-peak value (FIG. 30a) of the tracking signal of the CD is by far higher than that (FIG. 30b) of the SD1 such that the latter is not more than 20% assuming that the former is 100% in correspondence to points B and A in FIG. 29 respectively. When the reference value for the determination is set in the range of 20 to 100%, it therefore becomes possible to discriminate the CD and the SD1 from each other.

Figure 31A:
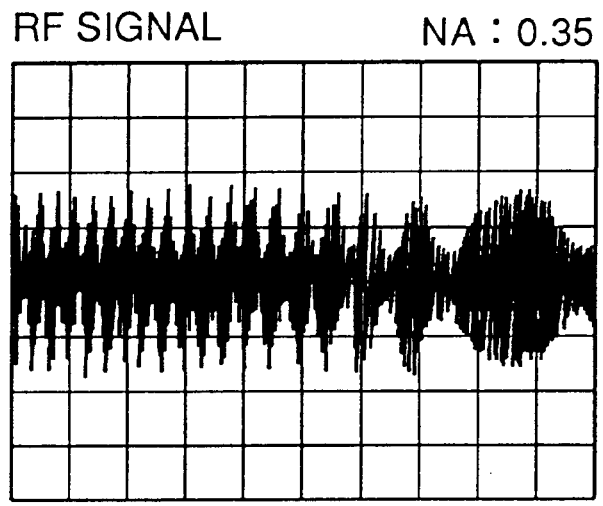
FIGS. 31a and 31b illustrate RF signal waveforms of a CD and an SD respectively.
Figure 31B:
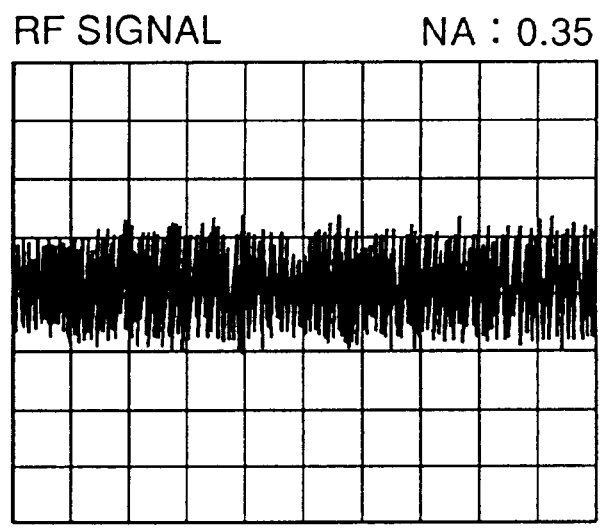

FIGS. 31a and 31b illustrate results of RF signal waveforms measured in a CD and an SD1 with a beam diameter of 1.5 $\mu$m, recording surface reflectivity of at least 70% and an effective numerical aperture NA of 0.35 respectively. The peak-to-peak value of the RF signal of the CD is higher than that of the RF signal of the SD1, such that the latter is about 60% assuming that the former is 100%. Thus, it is possible to discriminate the CD and the SD1 from each other also by detecting the RF signal levels.

(b) Discrimination of CD and SD2

In this case, the CD and the SD2 have different recording surface reflectivity of at least 70% and 20 to 40%, and different track pitches of 1.6 $\mu$m and 0.74 $\mu$m respectively. When tracking signal waveforms were measured as to the CD and the SD2 at a beam diameter of about 1.5 $\mu$m and an effective numerical aperture NA of 0.35 in practice, the peak-to-peak value of the CD was at the point A of FIG. 29 while that of the SD2 was at a point C which was further lower than the point B of the SD1 by 50%. Thus, the difference between the tracking signal levels of the CD and the SD2 is larger than that between the CD and the SD1, whereby these optical disks can be more readily discriminated from each other.

RF signals were also measured in practice as similarly done to the tracking signals, to find that the peak-to-peak value of the SD2 is further reduced by about 50% as compared to the SD1. Thus, the optical disks can be discriminated from each other also through the peak-to-peak values of the RF signals.

As hereinabove described, it is possible to discriminate the CD and the SD1, as well as the CD and the SD2 from each other through the peak-to-peak values of the tracking signals or the RF signals. Referring to FIGS. 32a and 32b, an operation for identifying each optical disk and reproducing information from the same is described. The operation is basically identical to that of the second embodiment shown in FIG. 8. An optical disk 1 which rotates at a constant rotational frequency is irradiated with a laser beam through a pickup 10 at an effective numerical aperture NA of 0.35, so that a tracking signal detected from the optical disk 1 is transmitted to a preamplifier 212, amplified by the preamplifier 212 and thereafter transmitted to a comparator 213. The comparator 213 detects a peak value of the received tracking signal, and compares the detected peak value of a previously set reference value, for identifying the optical disk 1 through the relation therebetween. When the reference value is set at 60 to 95% on the assumption that the tracking signal level of a CD having a reflection factor of at least 70% is 100%, for example, the comparator 213 determines that the optical disk 1 is a CD if the detected peak value is larger than 60 to 95%, while determining that the optical disk 1 is an SD1 or an SD2 if the detected peak value is smaller than 60 to 95%. The signal compared and identified in the comparator 213 is transmitted to a command part 215, which in turn outputs commands for switching the numerical aperture NA and switching a circuit necessary for reproducing information from the identified optical disk to an NA switching unit 216 and a circuit switching unit 217 respectively. In response to the command from the command part 215, the NA switching unit 216 changes the effective numerical aperture NA of the pickup 10 to be suitable for reproducing information from the identified optical disk. In other words, the NA switching unit 216 sets the numerical aperture NA at 0.55 to 0.65 or 0.30 to 0.45 for an SD1 or an SD2, or for a CD. The circuit switching unit 217 issues a command for circuit switching to an RF demodulation circuit 218, thereby enabling demodulation responsive to the optical disk from which information is to be reproduced. After the numerical aperture NA is set at the value responsive to the identified optical disk, an actual reproducing operation is started, similarly to the conventional operation. The reference value for identifying the optical disk is not restricted to 60 to 95%, but may preferably be in the range of 70 to 80%.

The aforementioned operation is identically performed also in case of identifying the optical disk through an RF signal, in place of the tracking signal. In this case, however, the reference value in the comparator 213 is set at 70 to 95% on the assumption that the RF signal level of a CD having a reflection factor of at least 70% is 100%, dissimilarly to the above. The reference value is not restricted to 60 to 95%, but may preferably be set in the range of 75 to 90%.

In the aforementioned embodiment, the effective numerical aperture NA of the pickup for identifying the optical disk is not restricted to 0.35, but may be in the range of 0.30 to 0.45.

(B) Reproducing Apparatus

The optical pickup and a reproducing apparatus in this embodiment are described. The optical pickup and the reproducing apparatus in the fifth embodiment are basically identical to those of the first to fourth embodiments. Therefore, redundant description is omitted.

In case of identifying the optical disk with any of the three types of optical pickups described with reference to the reproducing apparatus in the embodiment 1c, either the tracking or RF signal can be employed in this embodiment. The reference value for identifying the optical disk is set as described above. In case of employing a single optical pickup provided with a single objective lens whose numerical aperture NA is variable with the substrate thickness and changing the numerical aperture NA of the objective lens through an elliptical aperture, the reference value is set at 70 to 95%, i.e., in the range slightly higher than the aforementioned reference value. However, the reference value is not restricted to 70 to 95%, but is preferably in the range of 80 to 90%. When the RF signal level is employed for identification, the reference value is 80 to 95%, and more preferably 85 to 90%.

In the aforementioned embodiments (a) and (b), the CD, the SD1 and the SD2 can be discriminated from each other with laser beams having wavelengths of 585 to 690 (typical wavelength: 620 to 650) nm and 600 to 700 (typical wavelength 635 to 665) nm.

(6) Sixth Embodiment

Discrimination of CD, SD1 and HSD2

FIG. 33 shows minimum pit lengths, track pitches and reflectivity of a CD, a CD-ROM, an SD1 and an SD2 in case of employing a laser beam having a wavelength of 585 to 690 nm (typical wavelength: 620 to 650 nm, identical for the rest) respectively. On the other hand, FIG. 34 shows minimum pit lengths, track pitches and reflectivity of a CD, a CD-ROM, an SD1 and an SD2 in case of employing a laser beam having a wavelength of 600 to 700 nm (typical wavelength 635 to 650 nm, identical for the rest), respectively. While each of the CD-Rs shown in FIGS. 33 and 34 includes two types optical disks having different reflectivity, these optical disks are shown together.

Figure 35:
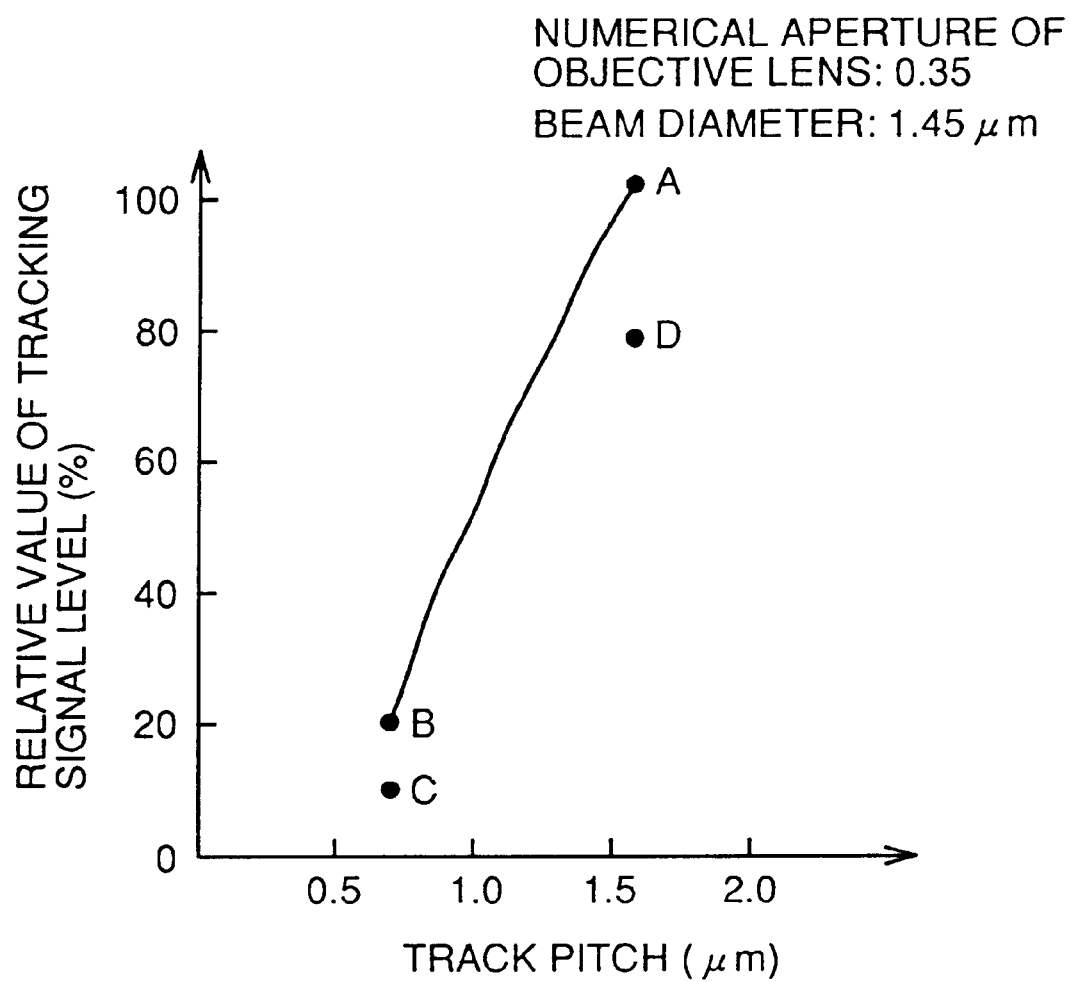
FIG. 35 illustrates the relation between tracking signal levels and track pitches of optical disks in the sixth embodiment.

FIG. 35 shows the relation between track pitches and relative values of tracking signals measured with a laser beam having a beam diameter of 1.45 µm while setting the numerical aperture NA at 0.35 which can focus the laser beam on recording surfaces of optical disks having substrate thicknesses of 0.6 mm and 1.2 mm, respectively. Points A, B, C and D show values of a CD, an SD1, an SD2 and a CD-R respectively. Assuming that the peak-to-peak value of the tracking signal of the CD is 100%, that of the SD1 is not more than 20% (point B in FIG. 35), and that of the tracking signal of the SD2 is further halved (point C in FIG. 35). On the other hand, the peak-to-peak value of the tracking signal of the CD-R is about 80% of that of the CD. The difference between the peak-to-peak values of the tracking signals result from the difference between the substrate thicknesses of the optical disks and that between the reflectivity. When first, second and third reference values of discrimination are set at 13 to 15%, 30 to 70% and 85 to 95% respectively, therefore, it is possible to discriminate the CD, the SD1, the SD2 and the CD-R from each other through the relative values of tracking signals detected with an objective lens whose numerical aperture NA is set at 0.35. When the reference value for discrimination is set in the range of 70 to 90%, on the other hand, the CD-R is identified if the relative value of the tracking signal detected with the objective lens whose effective numerical value NA is set at 0.35 is in the range of 70 to 90%, while the CD, the SD1 or the SD2 is identified if the relative value is out of this range. Thus, it is possible to discriminate the CD-R and the CD, as well as the SD1 and the SD2 from each other through the relative values of the tracking signals.

Further, it is possible to discriminate the CD, the SD1 as well as the SD2 and the CD from each other through RF signals. Assuming that RF signal strength of the CD which is detected by setting the effective numerical aperture NA of the objective lens at 0.35 is 100%, that of the CD-R is about 15%. Thus, it is possible to sufficiently determine whether a disk set on the reproducing apparatus is a CD or a CD-R from the detected RF signal strength. In this case, the reference value of discrimination is set in the range of 20 to 30%.

Also in this embodiment, any of the three types of pickups employed in the aforementioned embodiments is employed.

The numerical aperture NA of the objective lens is not restricted to 0.35, but may be in the range of 0.3 to 0.40.

(7) Seventh Embodiment (A) Discriminating Method

Figure 36:
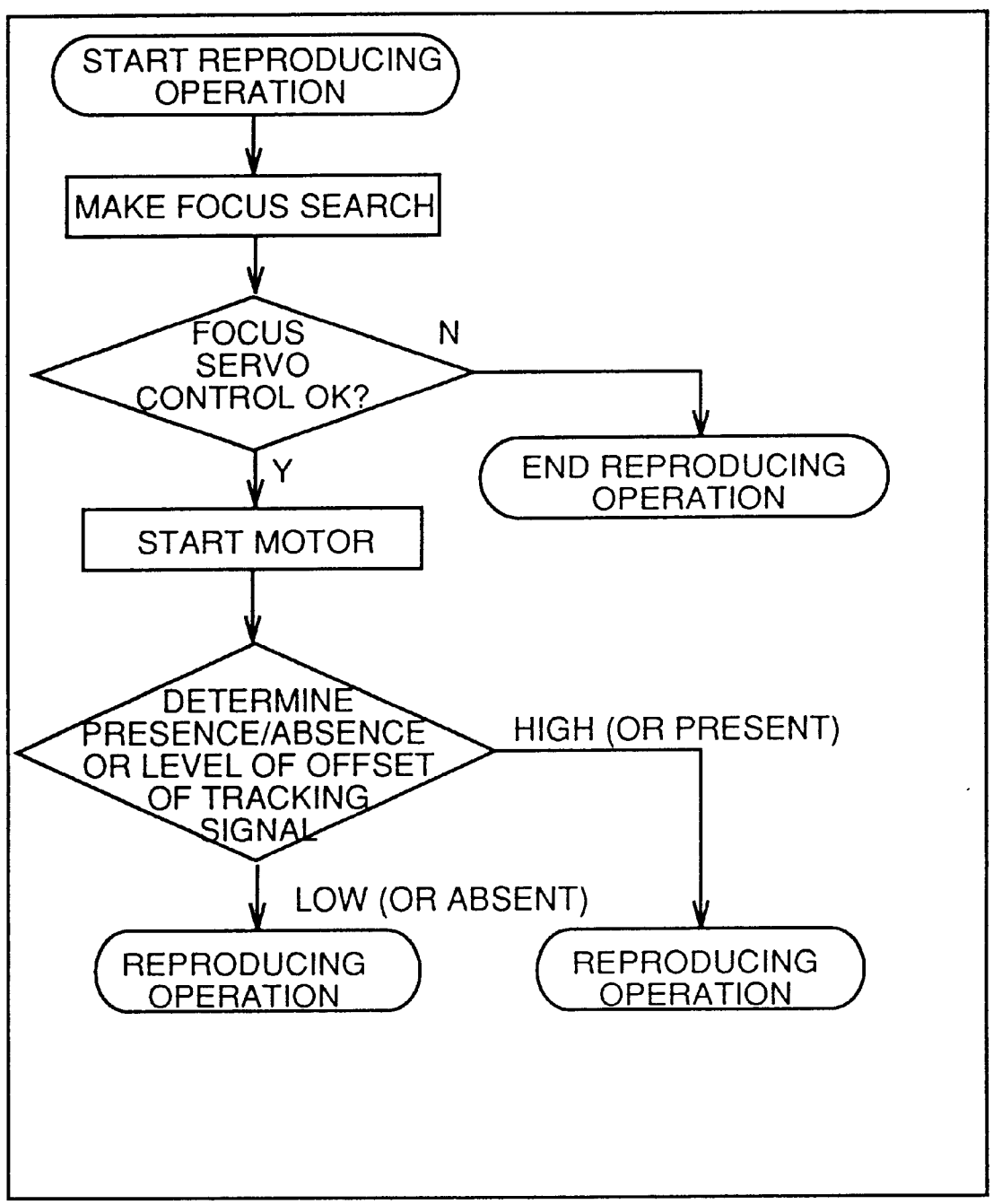
FIG. 36 is a flow chart showing an operation for reproducing information from an optical disk in a seventh embodiment of the present invention.

FIG. 36 is a flow chart showing a process from a reproducing operation start up to a reproducing operation according to a seventh embodiment of the present invention. The operation of reproducing information from an optical disk with an optical pickup is performed as follows: When the optical disk is mounted, the reproducing operation is started, for performing a focus search and focus servo control. If the focus servo control receives no OK, the reproducing operation is ended. If the focus servo control receives the OK, on the other hand, a motor is stated to perform tracking control, for starting an ordinary reproducing operation. A tracking error signal on a focused position is observed for identifying the mounted optical disk through the value of an offset dc component of the tracking error signal, for reproducing or recording information in response to the identified optical disk.

After the optical disk is identified, the numerical aperture NA of an objective lens is set in response to the identified optical disk similarly to the aforementioned embodiments, for starting the reproducing operation.

The identification of the optical disk in the seventh embodiment is described. Similarly to the aforementioned embodiments, optical disk is identified with an optical pickup having an objective lens having an effective numerical aperture NA which is variable. In the concrete, the operation is similar to those of the aforementioned embodiments, and hence redundant description is omitted.

This embodiment is adapted to detect a tracking error signal by a photodetector on a focused position after focus servo control receives the OK in a state setting the numerical aperture NA of an objective lens of an optical pickup at 0.6, for identifying each optical disk by the value of the detected tracking error signal. Namely, the numerical aperture NA of the objective lens is set at a value of 0.6 capable of focusing a laser beam on a recording surface of an optical disk having a substrate thickness of 0.6 mm, for detecting the tracking error signal in this state. In this case, an offset of the tracking signal from the optical disk having a substrate thickness of 0.6 mm is small while that from an optical disk having a substrate thickness of 1.2 mm is large since the numerical aperture NA of the objective lens is designed for the optical disk having a substrate thickness of 0.6 mm. Therefore, it is possible to discriminate optical disks having different substrate thicknesses from each other by determining the offset values. The design of the numerical aperture NA of the objective lens for detecting the tracking error signal on the focused position is not restricted to that for an optical disk having a thickness of 0.6 mm, but the numerical aperture NA may alternatively be designed for an optical disk having a substrate thickness of 1.2 mm. In this case, the offset of the tracking error signal from the optical disk having a substrate thickness of 0.6 mm is large, while that of the tracking error signal from the optical disk having a substrate thickness of 1.2 mm is small.

(7a) Discrimination of CD and SD1 or SD2

Discrimination between first and second optical disks having substrate thicknesses of 1.2 mm and 0.6 mm respectively, i.e., a CD and an SD1 or an SD2 in the concrete, is now described.

Figure 37A:
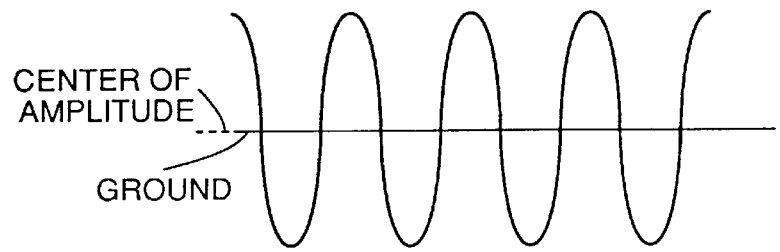
FIGS. 37a and 37b illustrate tracking error signals of various types of optical disks respectively.
Figure 37B:
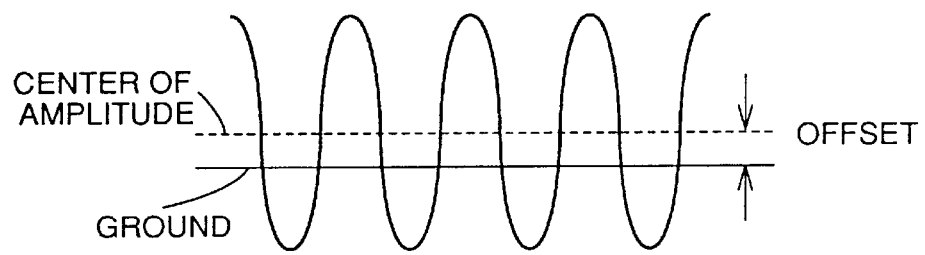

FIGS. 37a and 37b illustrate tracking error signals from the SD1 or the SD2 and from the CD at focused positions respectively. In this case, the numerical aperture NA of the objective lens is so designed that no offset is caused in a tracking error signal from an optical disk having a substrate thickness of 0.6 mm. Therefore, no offset is caused in the tracking error signal from the SD1 or the SD2 (FIG. 37a), while an offset is caused in the tracking error from the CD (FIG. 37b). This results from an influence by aberration due to the difference between the substrate thicknesses. Thus, it is possible to discriminate the SD1 or the SD2 and the CD from each other depending on whether or not offset is caused in the tracking error signals.

Figure 38A:
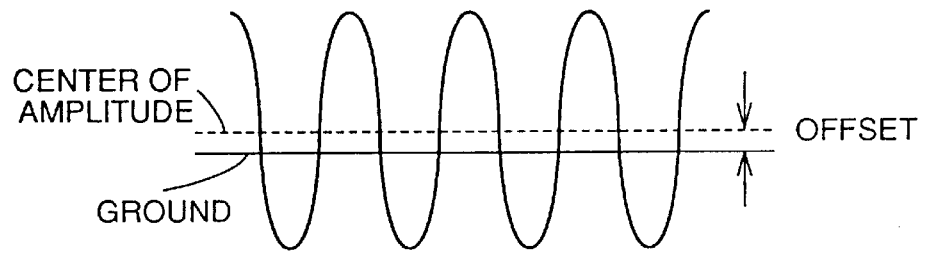
FIGS. 38a and 38b illustrate tracking error signals of various types of optical disks respectively.
Figure 38B:
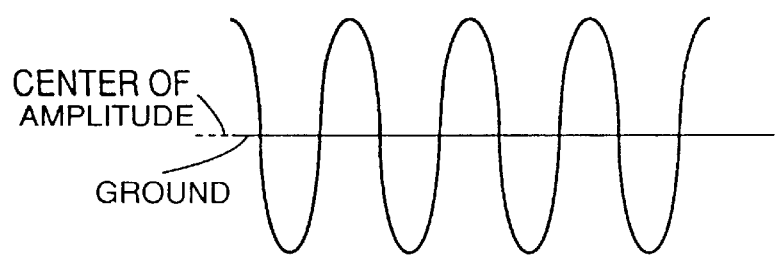

The numerical aperture NA of the objective lens is not restricted to the design for an optical disk having the substrate thickness of 0.6 mm, but may alternatively be designed for an optical disk having the substrate thickness of 1.2 mm. FIGS. 38a and 38b illustrate tracking error signals of an SD1 or an SD2 and a CD in focused positions in case of setting the effective numerical aperture NA of the objective lens at 0.35 (allowance: ±0.05, identical for the rest) through an aperture respectively. In this case, the effective numerical aperture NA of the objective lens is so designed that no offset is caused in a tracking error signal in an optical disk having a substrate thickness of 1.2 mm. Therefore, no offset is caused in the tracking error signal from the CD (FIG. 38b), while an offset is caused in the tracking error from the SD1 or the SD2 (FIG. 38a). This results from an influence by aberration due to the difference between the substrate thicknesses. Also in this case, therefore, it is possible to discriminate the SD1 or the SD2 and the CD from each other depending on whether or not offset is caused in the tracking errors.

While no offset is caused in the tracking error signal from the optical disk having one of the two substrate thicknesses in this embodiment 7a, the present invention is not restricted to this but offset may be slightly caused. In this case, it is possible to discriminate the SD1 or the SD2 and the CD from each other through the offset values.

(7b) Discrimination of CD and HSD1 or HSD2

Discrimination between first and third optical disks having substrate thicknesses of 1.2 mm and 0.6 mm respectively, i.e., a CD and an HSD1 or an HSD2 in the concrete, is now described.

Also in this case, it is possible to discriminate the CD and the HSD1 or the HSD2 from each other through presence/absence or values of offset in tracking error signals on focused positions. Tracking error signals of the HSD1 or the HSD2 and the CD detected by the photodetector while setting the numerical aperture NA of the objective lens at 0.6 are identical to those shown in FIGS. 37a and 37b respectively. On the other hand, tracking error signals of the HSD1 or the HSD2 and the CD detected by the photodetector while setting the numerical aperture NA of the objective lens at 0.35 through the aperture are identical to those shown in FIGS. 38a and 38b respectively.

Also in this embodiment, the present invention is not restricted to the case where no offset is caused in the tracking error signal from the optical disk having one of the two substrate thicknesses but offset may be slightly caused. In this case, it is possible to discriminate the HSD1 or the HSD2 and the CD from each other through the offset values.

(7c) In case of Employing Single Optical Pickup Provided with Two Objective Lenses having Different Numerical Apertures Each of the aforementioned embodiments 7a and 7b has been described with reference to the case of identifying each optical disk with a single optical pickup provided with a single objective lens. In relation to this embodiment 7c, identification of an optical disk with a signal optical pickup provided with two objective lenses having different effective numerical apertures NA is described. An apparatus employed in this case is identical to that shown in FIG. 21 in relation to the fourth embodiment, and hence redundant description is omitted. Also in this case, tracking error signals detected through an objective lens which is identical to the objective lens 2a in focused positions are identical to those shown in FIGS. 37a and 37b respectively, and those detected through an objective lens which is identical to the objective lens 2b on the focused positions are identical to those shown in FIGS. 38a and 38b respectively. Also in this case, therefore, it is possible to discriminate the HSD1 or the HSD2 and the CD from each other.

Also in this embodiment 7c, the present invention is not restricted to the case where no offset is caused in the tracking error signal from the optical disk having one of the substrate thicknesses but offset may be slightly caused. In this case, it is possible to discriminate the CD and the SD1 or the SD2, or the HSD1 or the HSD2 from each other through the offset values.

(7d) Discrimination of Optical Disks in case of Employing Two Optical Pickups

An apparatus employed in this case is absolutely identical to that described with reference to FIG. 22 in relation to the fourth embodiment, and hence redundant description is omitted.

Also in this case, tracking error signals detected with an optical pickup which is identical to the optical pickup 40 in focused positions are identical to those shown in FIGS. 37a and 37b respectively, and those detected through an objective lens which is identical to the objective lens 2b on the focused positions are identical to those shown in FIGS. 38a and 38b respectively. Also in this case, therefore, it is possible to discriminate the CD and the SD1 or the SD2, or the HSD1 or the HSD2 from each other.

Also in this embodiment 7d, the present invention is not restricted to the case where no offset is caused in the tracking error signal from the optical disk having one of the substrate thicknesses but offset may be slightly caused. In this case, it is possible to discriminate the CD and the SD1 or the SD2, or the HSD1 or the HSD2 from each other through offset values.

In each of the aforementioned embodiments 7a to 7d, it is possible to discriminate the optical disks from each other with a laser beam having a wavelength of 350 to 700 nm, preferably 400 m (allowance: ±50 nm), 500 nm (allowance: ±50 nm), 635 nm (allowance: ±50 nm) or 650 nm (allowance: ±50 nm), and more preferably 415 to 445 nm, 517 to 547 nm, 620 to 650 nm or 635 to 665 nm.

Further, the beam is not restricted to a circular shape but may have an elliptical shape, or any of the polygonal shapes shown in FIGS. 9a to 9g.

(B) Reproducing Apparatus

Figure 39:
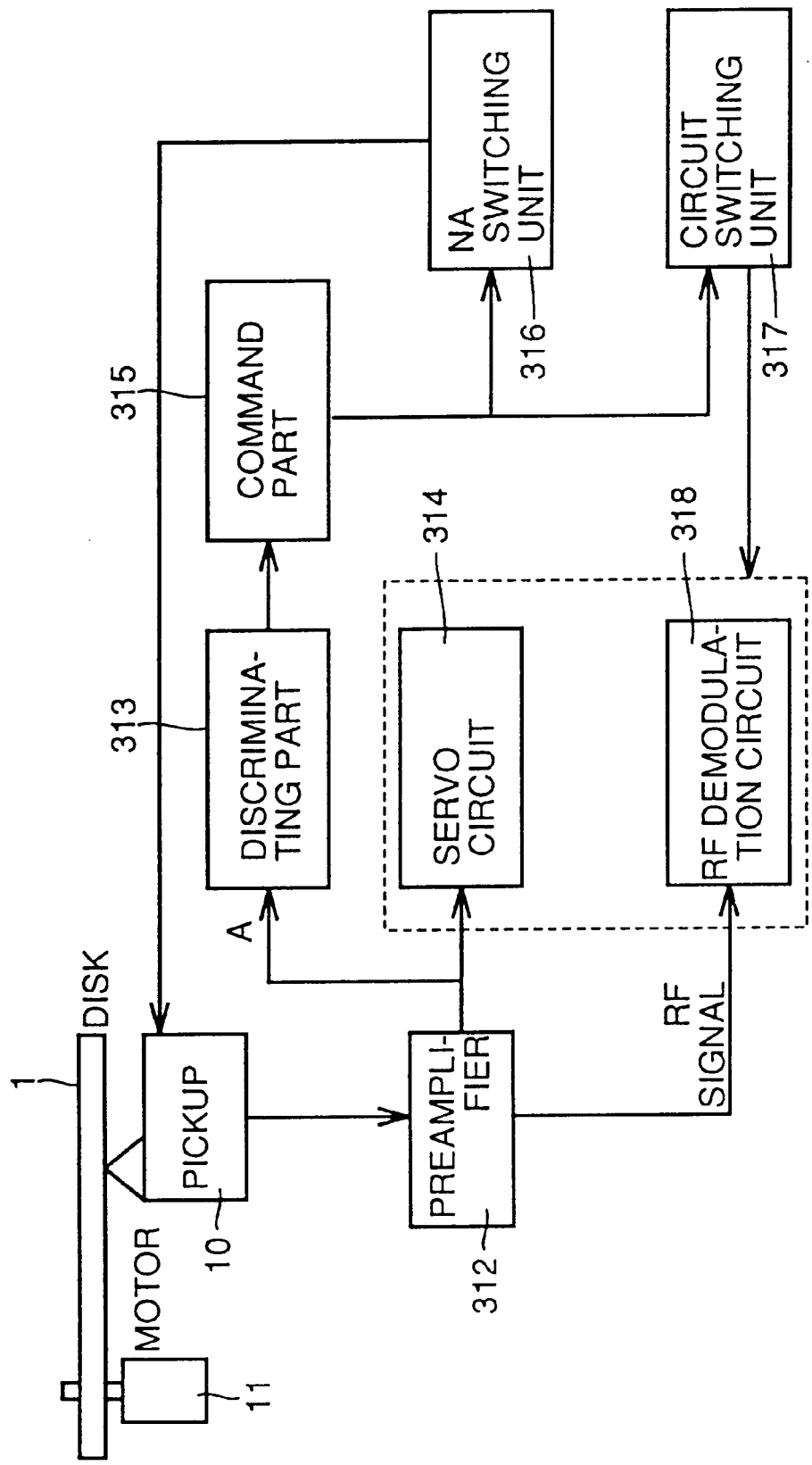
FIG. 39 is a block diagram showing a reproducing apparatus in the seventh embodiment.

FIG. 39 is a block diagram of an apparatus for identifying an optical disk and reproducing information. A tracking error obtained from an optical pickup 10 by any of the methods according to the aforementioned embodiments 7a to 7d is transmitted to a preamplifier 312, I–V converted by the preamplifier 312 and thereafter transmitted to a discriminating part 313. The discriminating part 313 detects the received tracking error signal, and identifies the optical disk through presence/absence or the value of offset. When a numerical aperture NA of an objective lens is set at 0.6, for example, an SD1, an SD2, an HSD1 or an HSD2 is identified if the tracking error signal has no offset, while a CD is identified if offset is caused in the tracking error signal. When the effective numerical aperture NA of the objective lens is set at 0.35, on the other hand, the discrimination reference is absolutely reversed, and hence information on the numerical aperture NA of the objective lens for detecting the tracking error signal is supplied to the discriminating part 313 by a numerical aperture detecting unit (not shown). The signal identified in the discriminating part 313 is transmitted to a command part 315, which in turn outputs commands for switching the numerical aperture NA and switching a circuit necessary for reproducing information from the identified optical disk to an NA switching unit 316 and a circuit switching unit 317 respectively. In response to the command from the command part 315, the NA switching unit 316 changes the effective numerical aperture NA of the objective lens of the pickup 10 to be suitable for reproducing information from the identified optical disk. Namely, the NA switching unit 316 sets the numerical aperture NA at 0.55 to 0.65, 0.30 to 0.55 or 0.20 to 0.30 with respect to a laser beam having a wavelength of 350 to 450 nm, for reproducing information from an HSD1 or an HSD2, from an SD1 or an SD2, or from a CD. With respect to a laser beam having a wavelength of 450 to 550 nm, the NA switching unit 316 sets the numerical aperture NA at 0.55 to 0.65, 0.40 to 0.55 or 0.25 to 0.40, for reproducing information from an HSD1 or an HSD2, from an SD1 or an SD2, or from a CD. With respect to a laser beam having a wavelength of 585 to 690 nm, the NA switching unit 316 sets the numerical aperture NA at 0.55 to 0.65 or 0.30 to 0.55, for reproducing information from an SD1, an SD2, an HSD1 or an HSD2, or from a CD. Also with respect to a laser beam having a wavelength of 600 to 700 nm, the NA switching unit 316 sets the numerical aperture NA at 0.55 to 0.65 or 0.30 to 0.55, for reproducing information from an SD1, an SD2, an HSD1 or an HSD2, or from a CD. On the other hand, the circuit switching unit 317 issues a command for circuit switching to an RF demodulation circuit 318, thereby enabling demodulation responsive to the optical disk from which information is to be reproduced. Thereafter information is reproduced from each optical disk. In case of reproducing information from the SD2 or the HSD2, however, the detected signal must be amplified, since the recording surface irradiated with the laser beam has a low reflection factor of about 30%. The preamplifier 312 may be stored in the pickup 10.

While the numerical aperture NA must be switched between three types of values in the aforementioned embodiment, the present invention is not restricted to this but the numerical aperture NA may be set at 0.30 or 0.60 for reproducing information from the CD, the SD1 or the SD2, or from the HSD1 or the HSD2 with respect to the laser beam having a wavelength of 350 to 450 nm. Alternatively, the numerical aperture NA may be set at 0.25 or 0.55 for reproducing information from the CD, or from the SD1, the SD2, the HSD1 or the HSD2. In other words, information is reproduced from second and third disks at a common numerical aperture NA if information is reproduced from a first optical disk at a single numerical aperture NA, or information is reproduced from the third optical disk at a single numerical aperture NA if information is reproduced from the first and second optical disks at a common numerical aperture NA. This is also applicable to laser beams of other wavelengths.

While the operation from identification of each optical disk to reproduction of information therefrom is described above, each optical disk can also be identified in the aforementioned method so that information is recorded therein. When a semiconductor laser unit having power of 30 mW for emitting a laser beam having a wavelength of 650 (allowable range: 600 to 700) nm, 635 (allowable range: 585 to 690) nm, 500 (allowable range: 450 to 550) nm or 400 (allowable range: 350 to 450) nm is employed, it is possible to record information in each of first, second and third optical disks by employing the optical pickup described above and setting the effective numerical aperture NA of the objective lens of the optical pickup at a value suitable for each optical disk and each wavelength.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for discriminating optical recording media from each other and reproducing information therefrom, comprising:

optical pickup means for picking up control signals being necessary for reproduction from optical recording media having different substrate characteristics including at least different thicknesses;

discriminating means for discriminating the types of said optical recording media on the basis of said control signals being picked up by said pickup means; and reproducing means for reproducing information from said optical recording media with said optical pickup means on the basis of discrimination results by said discriminating means, wherein said control signals being employed by said discriminating means for discrimination are focus error signals.

2. The apparatus in accordance with claim 1, wherein said optical pickup means includes a first optical pickup including an objective lens having a first numerical aperture and a second optical pickup being provided with an objective lens having a second numerical aperture being different from said first numerical aperture.

3. The apparatus in accordance with claim 2, wherein said first and second optical pickups are provided independently of each other.

4. The apparatus in accordance with claim 2, wherein said first and second optical pickups are integrally formed, said apparatus further including switching means for switching said objective lens having said first numerical aperture and said objective lens having said second numerical aperture.

5. The apparatus in accordance with claim 1, wherein said optical pickup means includes means for changing an effective numerical aperture of an objective lens in response to said optical recording media for reproducing information.

6. The apparatus in accordance with claim 1, wherein said control signals are S-curves of said focus error signals.

7. The apparatus in accordance with claim 6, wherein said S-curves of said focus error signals are measured by an objective lens having a single numerical aperture.

8. The apparatus in accordance with claim 6, wherein said S-curves of said focus error signals are detected by an objective lens having a first numerical aperture and another objective lens having a second numerical aperture being different from said first numerical aperture.

9. The apparatus in accordance with claim 1, wherein the types of said optical recording media further has at least different track pitches and different minimum pit lengths.

10. A method of discriminating the types of a plurality of optical recording media from each other and reproducing information therefrom, said method including the steps of:

preparing optical pickup means being capable of picking up control signals being necessary for reproducing from optical recording media having different substrate characteristics including at least different thicknesses;

discriminating the types of said optical recording media on the basis of said control signals being picked up by said optical pickup means; and reproducing information from said optical recording media with said optical pickup means on the basis of results of said discrimination wherein said control signals being employed by said discriminating means for discrimination are focus error signals.

11. The method in accordance with claim 10, wherein said step of preparing said optical pickup means includes a step of preparing a first optical pickup including an objective lens having a first numerical aperture and a second optical pickup being provided with an objective lens having a second numerical aperture being different from said first numerical aperture.

12. The method in accordance with claim 11, wherein said step of preparing said optical pickup means includes a step of preparing said first and second optical pickups independently of each other.

13. The method in accordance with claim 10, wherein the types of said optical recording media further has at least different track pitches and different minimum pit lengths.

* * * * *